US012435803B2

(12) United States Patent
O'Donnell et al.

(10) Patent No.: US 12,435,803 B2
(45) Date of Patent: Oct. 7, 2025

(54) FLOW ADJUSTMENT BASED ON PARTICLE MOVEMENT IN RESPONSE TO MAGNETIC FIELD

(71) Applicant: Analog Devices International Unlimited Company, Limerick (IE)

(72) Inventors: Alan J. O'Donnell, Castletroy (IE); Jan Kubík, Limerick (IE); Alfonso Berduque, Crusheen (IE); Jochen Schmitt, Biedenkopf (DE); Javier Calpe Maravilla, Algemesi (ES); Shaun Bradley, Patrickswell (IE); Padraig L. Fitzgerald, Mallow (IE); Stanislav Jolondcovschi, Carlow (IE); Gavin Patrick Cosgrave, Enniscorthy (IE); Michael P. Lynch, Bruff (IE); Eoin Edward English, Pallasgreen (IE)

(73) Assignee: Analog Devices International Unlimited Company, Limerick (IE)

( * ) Notice: Subject to any disclaimer, the term of this patent is extended or adjusted under 35 U.S.C. 154(b) by 175 days.

(21) Appl. No.: 18/323,798

(22) Filed: May 25, 2023

(65) Prior Publication Data
US 2023/0383855 A1    Nov. 30, 2023

Related U.S. Application Data

(60) Provisional application No. 63/365,445, filed on May 27, 2022.

(51) Int. Cl.
*F16K 13/10* (2006.01)
*B08B 9/08* (2006.01)

(52) U.S. Cl.
CPC .............. *F16K 13/10* (2013.01); *B08B 9/08* (2013.01); *B08B 2209/08* (2013.01)

(58) Field of Classification Search
CPC .. F16K 13/10; F16K 99/0046; F16K 99/0053; B01L 3/50273; B01L 3/502738; B08B 9/08
See application file for complete search history.

(56) References Cited

U.S. PATENT DOCUMENTS 3,956,938 A    5/1976   Carrico
3,970,112 A    7/1976   Bernard
(Continued)

FOREIGN PATENT DOCUMENTS

CN    102737803    10/2012
CN    1041133606   11/2014
(Continued)

OTHER PUBLICATIONS

Adeyiga et al., "Magnetic microparticle concentration and collection using a mechatronic magnetic ratcheting system", PLOS One, Feb. 18, 2021, pp. 1-15.
(Continued)

*Primary Examiner* — Umashankar Venkatesan
(74) *Attorney, Agent, or Firm* — Knobbe, Martens, Olson & Bear, LLP

(57) ABSTRACT

Aspects of this disclosure relate to adjusting fluid flow using magnetically sensitive particles. Fluid can flow through an opening in a container. Magnetically sensitive particles can be confined within the container. A magnetic field can be applied to move the magnetically sensitive particles in the container to adjust flow of the fluid through the opening.

19 Claims, 15 Drawing Sheets

(56) References Cited

U.S. PATENT DOCUMENTS

| | | | |
|---|---|---|---|
| 4,686,469 A | 8/1987 | Lewis | |
| 4,906,877 A | 3/1990 | Ciaio | |
| 5,502,378 A | 3/1996 | Atteberry et al. | |
| 5,691,208 A * | 11/1997 | Miltenyi | B03C 1/0332 |
| | | | 435/7.1 |
| 6,159,378 A | 12/2000 | Holman et al. | |
| 6,392,562 B1 | 5/2002 | Boston et al. | |
| 6,623,984 B1 | 9/2003 | Fleischman et al. | |
| 6,764,861 B2 | 7/2004 | Prinz et al. | |
| 6,982,501 B1 | 1/2006 | Kotha et al. | |
| 7,446,524 B2 | 11/2008 | Tondra | |
| 7,547,415 B2 * | 6/2009 | Hataoka | F16K 99/0001 |
| | | | 436/180 |
| 7,575,934 B2 | 8/2009 | Atwood | |
| 7,609,054 B2 | 10/2009 | Tondra et al. | |
| 7,892,856 B2 | 2/2011 | Grate et al. | |
| 8,011,424 B2 | 9/2011 | Murray | |
| 8,020,586 B2 * | 9/2011 | Delamarche | F16K 99/0001 |
| | | | 137/831 |
| 8,051,878 B2 * | 11/2011 | Delamarche | B01L 3/502738 |
| | | | 137/831 |
| 8,190,372 B2 | 5/2012 | Kahlman et al. | |
| 8,283,912 B2 | 10/2012 | Nieuwenhuis et al. | |
| 8,339,370 B2 | 12/2012 | Yun et al. | |
| 8,400,410 B2 | 3/2013 | Taylor et al. | |
| 8,453,505 B2 | 6/2013 | Erdler et al. | |
| 8,689,981 B2 | 4/2014 | Stone et al. | |
| 8,779,532 B2 | 7/2014 | O'Donnell et al. | |
| 8,815,610 B2 | 8/2014 | Berman et al. | |
| 8,957,679 B2 * | 2/2015 | Loreit | G01R 33/096 |
| | | | 324/252 |
| 9,041,150 B2 | 5/2015 | O'Donnell et al. | |
| 9,098,141 B2 | 8/2015 | Ciesla et al. | |
| 9,103,824 B2 | 8/2015 | Ovsyanko | |
| 9,151,409 B2 * | 10/2015 | Friedrich | F16K 7/16 |
| 9,157,891 B2 | 10/2015 | Ovsyanko et al. | |
| 9,304,131 B2 | 4/2016 | Ovsyanko | |
| 9,678,064 B2 | 6/2017 | Djennati et al. | |
| 9,737,244 B2 | 8/2017 | Ziaie et al. | |
| 9,786,969 B2 | 10/2017 | Masias | |
| 9,841,421 B2 | 12/2017 | Dittmer et al. | |
| 9,874,294 B2 * | 1/2018 | Den Dulk | F16K 99/0044 |
| 9,999,369 B2 | 6/2018 | Ziaie et al. | |
| 10,016,765 B2 * | 7/2018 | Chen | B01L 3/50273 |
| 10,040,062 B2 * | 8/2018 | Beebe | B01L 3/563 |
| 10,092,903 B2 | 10/2018 | Prins et al. | |
| 10,145,906 B2 | 12/2018 | O'Donnell et al. | |
| 10,357,771 B2 * | 7/2019 | Bharadwaj | B01F 23/41 |
| 10,620,151 B2 | 4/2020 | Berduque et al. | |
| 10,627,269 B2 | 4/2020 | Mazumdar et al. | |
| 10,730,743 B2 | 8/2020 | Kierse et al. | |
| 10,733,906 B2 | 8/2020 | Pascall | |
| 10,809,195 B2 | 10/2020 | Krishnamoorthy et al. | |
| 10,888,861 B2 * | 1/2021 | Reiter | B32B 37/06 |
| 10,890,559 B2 * | 1/2021 | Bercovici | G01N 27/44721 |
| 10,967,122 B2 | 4/2021 | Cima | |
| 11,035,498 B2 | 6/2021 | Alfadhel et al. | |
| 11,085,554 B2 | 8/2021 | Mou et al. | |
| 11,119,161 B2 | 9/2021 | Iwasaki et al. | |
| 11,127,716 B2 | 9/2021 | McGeehan et al. | |
| 11,214,061 B2 | 1/2022 | Glusti et al. | |
| 11,228,310 B2 | 1/2022 | Zhao et al. | |
| 11,231,635 B2 | 1/2022 | Moon et al. | |
| 11,292,000 B2 * | 4/2022 | Mao | B03C 1/01 |
| 11,307,055 B2 | 4/2022 | Schmitt | |
| 11,313,876 B2 | 4/2022 | Zhang et al. | |
| 11,363,427 B2 * | 6/2022 | Volkerink | H04W 4/027 |
| 11,525,820 B2 | 12/2022 | Meier et al. | |
| 11,666,910 B2 * | 6/2023 | Anderson | B01L 7/525 |
| | | | 435/6.12 |
| 11,666,913 B2 | 6/2023 | Beaumont et al. | |
| 11,788,646 B1 | 10/2023 | Huff | |
| 2003/0000833 A1 | 1/2003 | Mansouri et al. | |
| 2008/0060710 A1 | 3/2008 | Carlson et al. | |
| 2008/0128391 A1 | 6/2008 | Chen et al. | |
| 2011/0206560 A1 * | 8/2011 | Neijzen | G01N 33/54326 |
| | | | 422/69 |
| 2011/0304326 A1 | 12/2011 | Sandhu | |
| 2016/0064126 A1 | 3/2016 | Timonen et al. | |
| 2017/0328931 A1 | 11/2017 | Zhang et al. | |
| 2019/0135614 A1 | 5/2019 | Kierse et al. | |
| 2020/0072783 A1 | 3/2020 | Berney et al. | |
| 2021/0148850 A1 | 5/2021 | Berduque et al. | |
| 2021/0262973 A1 | 8/2021 | Berduque et al. | |
| 2021/0322681 A1 | 10/2021 | Bolognia et al. | |
| 2022/0362778 A1 | 11/2022 | Foster et al. | |
| 2023/0098962 A1 * | 3/2023 | O'Donnell | G01R 33/0286 |
| | | | 324/210 |
| 2023/0152166 A1 | 5/2023 | O'Donnell et al. | |
| 2023/0201833 A1 * | 6/2023 | Wang | B01L 3/502715 |
| | | | 422/554 |
| 2023/0249182 A1 * | 8/2023 | Qin | G01N 15/1459 |
| | | | 422/502 |
| 2023/0264198 A1 | 8/2023 | O'Donnell et al. | |
| 2023/0349987 A1 | 11/2023 | O'Donnell et al. | |
| 2024/0044725 A1 | 2/2024 | O'Donnell et al. | |
| 2024/0044726 A1 | 2/2024 | O'Donnell et al. | |

FOREIGN PATENT DOCUMENTS

| | | |
|---|---|---|
| CN | 205404333 | 7/2016 |
| CN | 108957365 | 12/2018 |
| CN | 111600456 | 8/2020 |
| CN | 110671957 | 5/2021 |
| FR | 2671870 | 7/1992 |
| KR | 1020150088682 | 8/2015 |
| WO | WO 2006/122203 | 11/2006 |
| WO | WO 2021/081103 | 4/2021 |

OTHER PUBLICATIONS

Al-Hetlani et al., "Continuous magnetic droplets and microfluidics: generation, manipulation, synthesis, and detection", Microchim Acta, 186, 55, 2019.

Berkelman et al., "Electromagnetic Haptic Feedback System for Use With a Graphical Display Using Flat Coils and Sensor Array", IEEE Robotics and Automation Letters, Apr. 2020, vol. 5, No. 2, pp. 1618-1625.

Boehler et al., "Sensors in the Autoclave-Modelling and Implementation of the IoT Steam Sterilization Procedure Counter", Sensors, 2021, 21(510) 1-17.

Bruls et al., "Rapid integrated biosensor for multiplexed immunoassays based on actuated magnetic nanoparticles", Lab Chip, 2009, pp. 3504-3510.

Cao et al., "Recent advances in manipulation of micro- and nano-objects with magnetic fields at small scales", Materials Horizons, 2020, 7, pp. 638-666.

Campos et al., "Technologies applied in the monitoring and control of the temperature in the Cold Chain", IEEE, 2018, in 6 pages.

Chae et al., "Bimodal neural probe for highly co-localized chemical and electrical monitoring of neural activites in vivo", Biosensors and Bioelectronics, 2021, vol. 191, pp. 1-11.

Chihiro et al., "Development of Molecular Interaction Assay Using Magneto-Resistance Sensor", The 42nd Annual Meeting of the Molecular Biology Society of Japan, Dec. 2019.

Datta, P., "Magnetic Gels", Polymeric Gels, 2018, pp. 441-465.

D'Uva et al., "Batteryless Wireless Temperature/Humidity Sensor for Item-level Smart Pharma Packaging", IEEE, 2021, pp. 145-149.

Gaster et al., "Matrix-insensitive protein assays push the limits of biosensors in medicine", Nature Medicine, Nov. 2009, 15(11): 1327-1333.

Germano et al., "A Portable and Autonomous Magnetic Detection Platform for Biosensing", Sensors, May 27, 2009, 9:4119-4137.

Gomez-Pastora et al., "Optimization of Magnetic Blood Cleansing Microdevices", Microfluidics Archives—FLOW-3D, pp. 1-24.

Hellebrekers et al., "Soft Magnetic Skin for Continuous Deformation Sensing", Advanced Intelligent Systems, Jul. 25, 2019, 1900025, pp. 1-6.

(56) References Cited

OTHER PUBLICATIONS

Ji et al., "An Online Cold-Chain Monitoring System Powered by Miniature Smart Tag and Blockchain", IEEE 5th International Conference on Universal Village, 2020, in 5 pages.
Juncker et al., "Cross-reactivity in antibody microarrays and multiplexed sandwich assays: shedding light on the dark side of multiplexing", Current Opinion in Chemical Biology, 2014, vol. 18, pp. 29-37.
Kabe et al., "Application of high-performance magnetic nanobeads to biological sensing devices", Analytical and Bioanalytical Chemistry, Jan. 9, 2019, 411:1825-1837.
Le et al., "Inkjet-Printed Graphene for Flexible Micro-Supercapacitors", IEEE, Aug. 15-18, 2011, pp. 67-71.
Lee et al., "Experimental Investigation of Magnetic Particle Movement in Two-Phase Vertical Flow under an External Magnetic Field Using 2D LIF-PIV", Applied Sciences, Jun. 8, 2020, 10, 3976, pp. 1-17.
Lee et al., "Thermomagnetic Convection of Ferrofluid in an Enclosure Channel with an Internal Magnetic Field", Micromachines, Aug. 21, 2019, 10, 553, pp. 1-8.
Liu et al., "A Frequency- and Polarization-Reconfigurable Slot Antenna Using Liquid Metal", IEEE Transactions on Antennas and Propagation, vol. 68, No. 11, Nov. 2020, pp. 7630-7635.
"Magnetic Separation of Sepsis Pathogen Out of Infected Blood" Medgadget Editors, Mar. 25, 2009.
Maity et al., "Manipulation of Magnetic Properties by Tunable Magnetic Dipoles in a Ferromagnetic Thin Film", IEEE Magnetic Letters, Mar. 21, 2017, vol. 8, in 4 pages.
Mohapatra et al., "Electric Stimulus-Responsive Chitosan/MNP Composite Microbeads for Drug Delivery System", IEEE Transactions on Biomedical Engineering, Jan. 2020, vol. 67, No. 1, pp. 226-233.
Mohammadi et al., "Fingertip Force Estimation via Inertial and Magnetic Sensors in Deformable Object Manipulation" IEEE, Apr. 8-11, 2016, pp. 284-289.
Ngyuen, N.T., "Micro-magnetofluidics: Interactions between magnetism and fluid flow on the microscale", Microfluidics and Nanofluidics, Nov. 16, 2011, in 17 pages.
Osterfeld et al., "MagArray Biochips for Protein and DNA Detection with Magnetic Nanotags: Design, Experiment, and Signal-to-Noise Ratio", Chapter 15 of Microarrays, 2008, pp. 299-314.
"Polystyrene Magnetic Particles", MagSphere Inc., 2021.
Rife et al., "Design and performance of GMR sensors for the detection of magnetic microbeads in biosensors", For Sensors and Actuators A, Mar. 19, 2003, in 34 pages.
Shafiq et al., "A Battery-Free Temperature Sensor With Liquid Crystal Elastomer Switching Between RFID Chips", IEEE Access, May 21, 2020, vol. 8, pp. 87870-87883.
Shanko et al., Microfluidic Magnetic Mixing at Low Reynolds Numbers and in Stagnant Fluids, Micromachines, Oct. 29, 2019, 10, 731, pp. 1-23.
Sigma-Aldrich, List of Polystyrene Products, available at:|https://www.sigmaaldrich.com/US/en/search/polystyrene?focus=products&page=1&perpage=30&sort=relevance&term=polystyrene&type=product (accessed Oct. 1, 2021).

Tian, B., "Magnetic Nanoparticle Based Biosensors for Pathogen Detection and Cancer Diagnostics", Digital Comprehensive Summaries of Uppsala Dissertations from the Faculty of Science and Technology 1647, May 4, 2018, in 56 pages.
"Use of Paraffin Wax with Different Melting Points", King Honor International, Jun. 17, 2019.
Wang et al., "A Mechanically Tunable Artificial Magnetic Conductor using 3-D Printing Technology", IEEE, Sep. 25-27, 2018, in 4 pages.
Wang et al., "Advances in Giant Magnetoresistance Biosensors With Magnetic Nanoparticle Tags: Review and Outlook", IEEE, Jul. 2008, 44(7): 1687-1702.
Wanganoo et al., "Real-Time Data Monitoring in Cold Supply Through Nb- IoT", IEEE, Jul. 1-3, 2020, in 6 pages.
Xu et al., "Giant magnetoresistive biochip for DNA detection and HPV genotyping", Biosensors and Bioelectronics, Sep. 15, 2008, vol. 24, pp. 99-103.
Xu et al., "Giant Magnetoresistive Sensors for DNA Microarray", IEEE, Nov. 2008, 44(11): 3989-3991.
Yu et al., "Giant magnetoresistive biosensors for molecular diagnosis: surface chemistry and assay development", Proceedings of SPIE 7035, Biosensing, Aug. 29, 2008.
Yu et al., "Magnetic sensors as a novel multiplex immunoassay platform with high sensitivity", MagArray.
Yu et al., "Sensitive detection of cTnI in whole blood on MagArray biosensors", MagArray.
Yu et al., "Multiplex Autoantibody Detection Using MagArray GMR Biosensors", MagArray.
Yunas et al., "Polymer-Based MEMS Electromagnetic Actuator for Biomedical Application: A Review", Polymers, May 22, 2020, 12, 1184, pp. 1-21.
Yasui et al., "Magnetic Micro Actuator with Neutral Buoyancy and 3D Fabrication of Cell Size Magnetized Structure" IEEE, May 14-18, 2012, pp. 745-750.
Zhang et al., "A perspective on magnetic microfluidics: Towards an intelligent future", Biomicrofluidics, 2022, vol. 16, in 9 pages.
Zheng et al., "A Disposable Array Chip using Temperature-Responsive Color Change to Record Temperature History in Terminal Cold Chain Transportation", IEEE, Jun. 23-27, 2019, pp. 1941-1944.
Zhou et al., "Self-powered Continuous Time-Temperature Monitoring for Cold-Chain Management", IEEE, 2017, pp. 879-882.
Dash et al., "Selection of metallic liquid in sub-6 GHz antenna design for 6G networks," Scientific Reports, 2013, 13, in 8 pages.
"Magnetic Separation of Sepsis Pathogen Out of Infected Blood," Medgadget, Mar. 25, 2009, 1 page.
Chen et al. "Biosensing Using Magnetic Particle Detection Techniques." Sensors, 17.10, 2017, pp. 1-35.
Krishnapriya et al. "Detection of Magnetic Particles Using Induction-balance Microsensor based on Non-spiral Planar Microcoils," 2018 IEEE Sensors, 2018, in 4 pages.
Wu et al. "Magnetic-Nanosensor-Based Virus and Pathogen Detection Strategies Before and During COVID-19," ACS Applied Nano Materials, 2020, 3.10, pp. 9560-9580.
Wu et al. "Magnetic Immunoassays: A review of Virus and Pathogen Detection before and amidst the Coronavirus Disease-19 (COVID-19)," arXiv preprint arXiv:2007.04809, 2020, in 35 pages.

\* cited by examiner

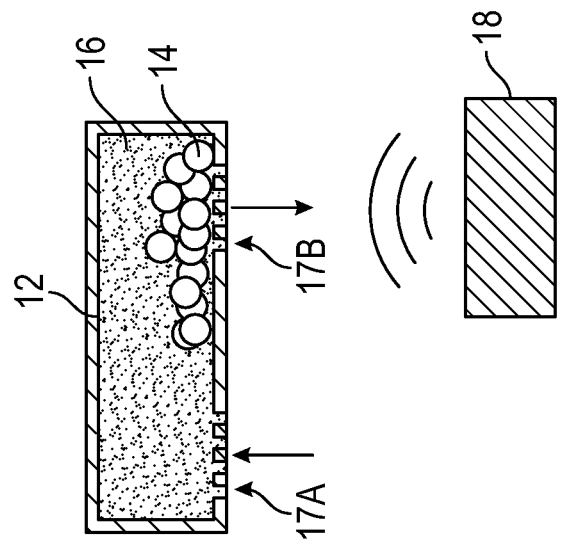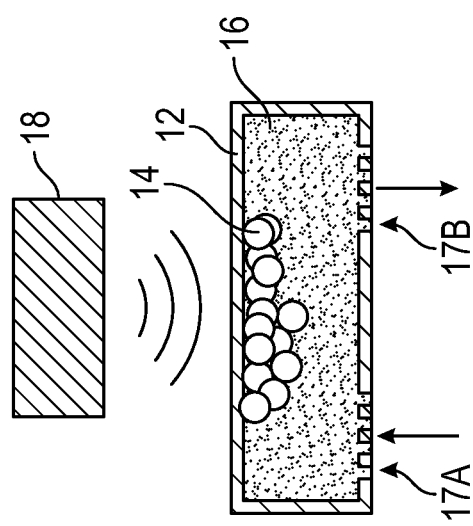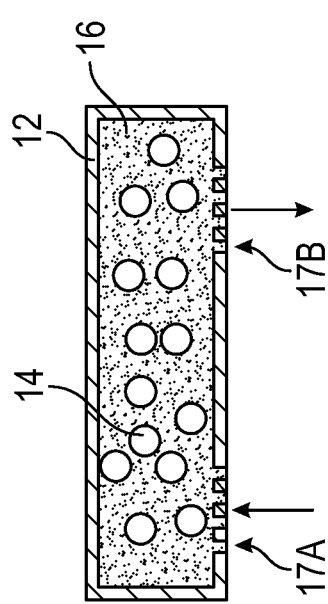

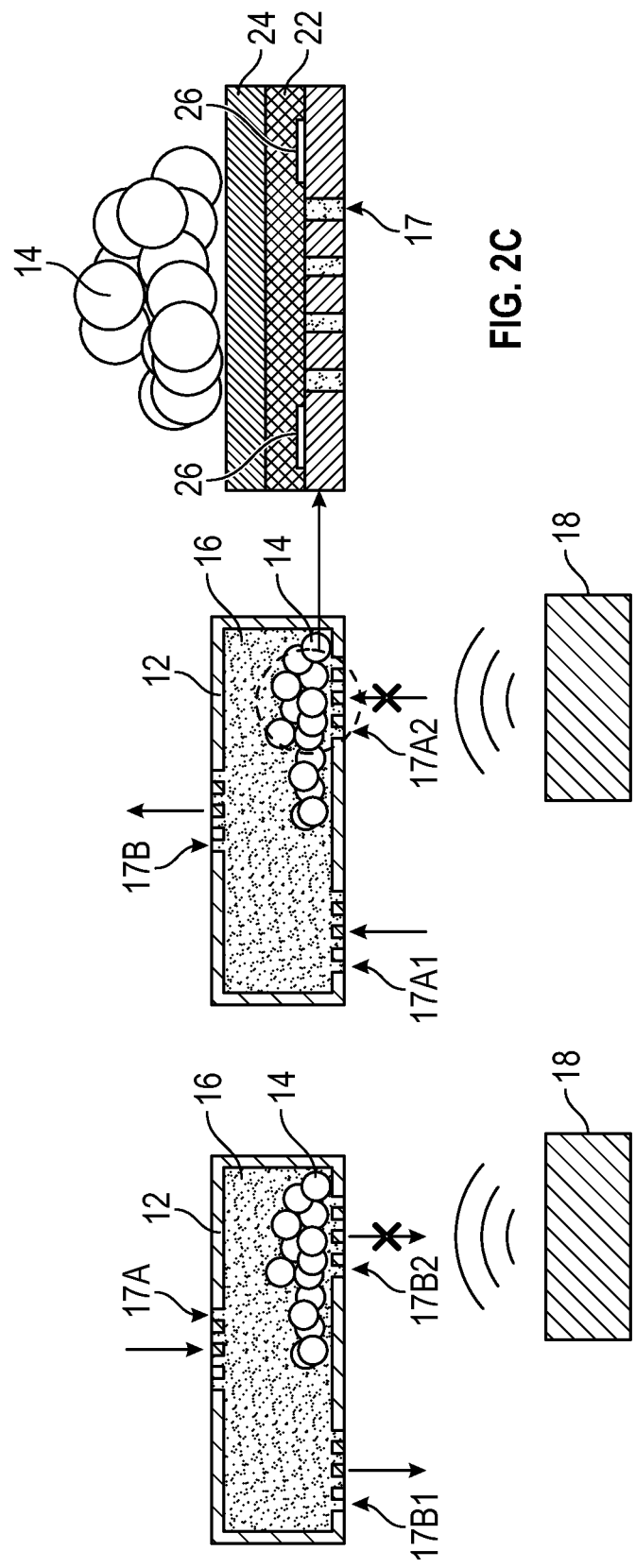

Side View/
Cross-Section

Side View/
Cross-Section

Side View/
Cross-Section

Side View/
Cross-Section

Side View/
Cross-Section

Side View/
Cross-Section

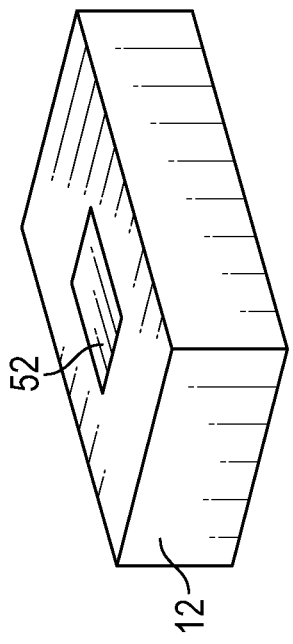
FIG. 5A
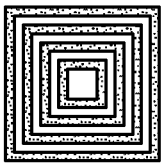
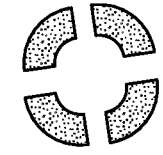
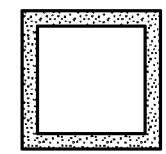
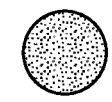
FIG. 5B
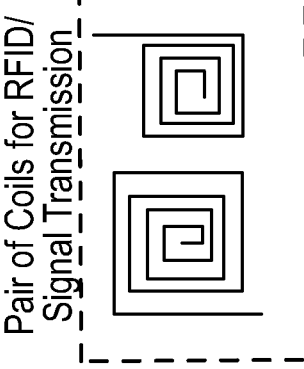
FIG. 5C
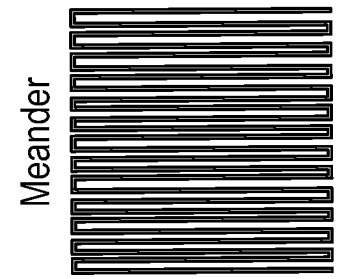
FIG. 5D
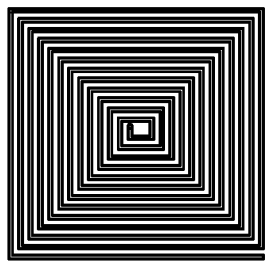
FIG. 5E

FLOW ADJUSTMENT BASED ON PARTICLE MOVEMENT IN RESPONSE TO MAGNETIC FIELD

CROSS REFERENCE TO PRIORITY APPLICATION

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/365,445, filed May 27, 2022 and titled "FLOW ADJUSTMENT BASED ON PARTICLE MOVEMENT IN RESPONSE TO MAGNETIC FIELD," the disclosure of which is hereby incorporated by reference in its entirety and for all purposes.

BACKGROUND

Technical Field

The disclosed technology relates to adjusting flow of a fluid based on particle movement.

Description of Related Technology

Fluid can flow through openings in a variety of applications. An opening can be valved to control whether the fluid flows through the opening or the amount or rate of flow through the opening. A variety of valves can be implemented to control fluid flow.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method flow adjustment. The method includes allowing fluid to flow through an opening in a container. Magnetically sensitive particles are confined within the container. The method also includes applying a magnetic field to move the magnetically sensitive particles in the container to adjust flow of the fluid through the opening.

The applying can cause the magnetically sensitive particles to block at least part of the opening. The magnetically sensitive particles can block the opening such that no fluid flows through the opening in response to the applying. The magnetically sensitive particles can block the opening to reduce flow of the fluid through the opening to a non-zero flow in response to the applying.

The applying can cause the magnetically sensitive particles to increase flow of the fluid through the opening by providing less flow restriction.

The container can include a plurality of openings, and individual particles of the magnetically sensitive particles can be larger than individual openings of the openings. The magnetically sensitive particles can have a coating and/or shape to increase flow restriction through the opening.

The applying the magnetic field can open or close a channel.

The method can include receiving a wireless signal. The applying the magnetic field can be in response to the wireless signal.

The opening can be an outlet of the container. The applying can cause the magnetically sensitive particles to block at least part of the opening. The container can include a second outlet that is not blocked by the magnetically sensitive particles as a result of the applying.

The opening can be an inlet of the container. The applying can cause the magnetically sensitive particles to block at least part of the opening. The container can include a second inlet that is not blocked by the magnetically sensitive particles as a result of the applying.

There can be at least one of a mesh, a membrane, or a filter over the opening. The method can include altering the flow of the fluid through the opening with at least one of a mesh, a membrane, a heating element, or a piezoelectric element.

The method can include at least partly removing a blockage of the opening or a build up of sediment with at least one of a heating element or a piezoelectric element. The method can include moving particles to dislodge material build-up and/or clean specific areas within the container.

The magnetic field can be applied with a magnetic structure that is integrated with the container.

Another aspect of this disclosure is a system with flow restriction. The system includes a container that includes an opening, magnetically sensitive particles that are retained within the container, and a magnetic structure configured to apply a magnetic field to cause at least one of the magnetically sensitive particles to block at least part of the opening to thereby restrict flow of fluid through the opening.

The system can be configured to selectively divert the flow of fluid along a specific channel.

The system can include a sensor configured to output information indicative of a property of the fluid flowing through the container. The system can include an antenna configured to wireless transmit the information indicative of the property of the fluid flowing through the container.

The magnetic structure can be configured to cause one or more of the magnetically sensitive particles to move to such that the flow of fluid through the opening increases.

The container can include a plurality of openings. Individual particles of the magnetically sensitive particles can be larger than individual openings of the plurality of openings.

The opening can be an outlet of the container. The opening can be an inlet of the container.

The magnetic structure can be integrated with the container.

The system can include a biasing structure configured to reset positions of the magnetically sensitive particles.

The magnetically sensitive particles can have a coating that reacts to a specific element or material. The coating can be functionally active in a chemical or biological manner such that the coating interacts with the fluid.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 1A, 1B, and 1C are schematic side or cross-sectional views of a container that includes magnetically sensitive particles in different positions that affect fluid flow according to an embodiment.

FIGS. 2A and 2B are schematic side or cross-sectional views of a container that includes magnetically sensitive particles impeding fluid flow through an opening of the container according to embodiments. FIG. 2C illustrates additional structures that can be positioned about openings in the container of FIGS. 2A and 2B that can affect fluid flow according to embodiments.

FIG. 5A is a schematic isometric view of a container that includes magnetically sensitive particles and a magnetic structure on the container according to an embodiment. FIG. 5B illustrates example magnetic material patterns for the magnetic structure on the container of FIG. 5A. FIG. 5C illustrates examples of coils for antennas that can be implemented on the container of FIG. 5A. FIGS. 5D and 5E illustrate examples of a meander structure and a coil structure, respectively, where either or both of these structures can be implemented on the container of FIG. 5A.

DETAILED DESCRIPTION OF CERTAIN EMBODIMENTS

Figure 2D:
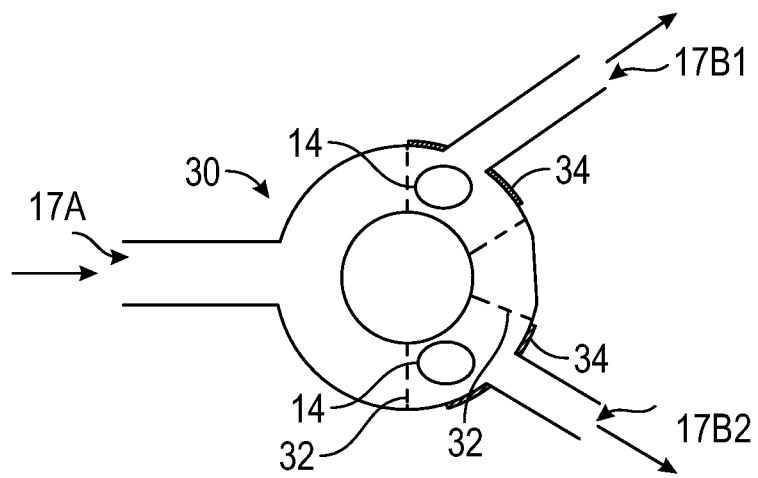
FIGS. 2D and 2E show a circular flow containers/chambers according to embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings. The headings provided herein are for convenience only and do not necessarily affect the scope or meaning of the claims.

Aspects of this disclosure relate to adjusting flow of fluid through an opening of a container by moving particles within the container in response to a magnetic field. Fluid can flow through the opening of the container. Particles within the container can move in response to a magnetic stimulus. This can adjust the flow of the fluid through the opening. For example, the magnetic stimulus can move the particles such that the opening is at least partly blocked to reduce the flow of the fluid. As another example, the magnetic stimulus can move the particles way from the opening to increase the flow of the fluid through the opening. The particles can implement valving of the opening in response to a magnetic field. The container can include a plurality of openings where individual particles of the particles are larger than individual openings of the openings. The container can include channels with apertures and/or openings connected to channels external to the container. The container can include one or more integrated structures to move the particles. The one or more integrated structures can include a piezoelectric element and/or a heating element that can cause mechanical movement of one or more of fluid, particles or structures.

Magnetically sensitive particles can be included in a fluid within a container. The container has one or more openings through which the fluid can flow while the container confines the magnetically sensitive particles within the container. An applied magnetic field can move the magnetically sensitive particles to restrict flow of the fluid through the at least one of the one or more openings. Magnetically sensitive particles can be contained within channels or portions of channels within the container.

Embodiments disclosed herein can achieve advantages over other systems and methods of flow control. Flow control can be implemented in response to a magnetic stimulus as opposed to other valving techniques. Containers with particles for flow control can maintain functionality under conditions where mechanical valving may fail. Mechanisms to remove blockages can be implemented in embodiments disclosed herein that can reduce or eliminate maintenance relative to other flow control systems.

Valves can be remotely activated to manipulate fluid flow within a microfluidic system (e.g., by enabling structures that move particles to either block or open channels as desired in a specific application). Manipulating particles in certain places within channels or microfluidic systems may also enable sediment build up or fouling to be alleviated. In certain applications, the movement of particles may agitate or manipulate the fluid itself in specific places and enable an analysis or treatment step to be implemented. The manipulation of fluid through specific channels could also be implemented as part of a separating step. This can be where a defined amount of fluid is diverted for sampling or some further processing depending on the application.

In order to avoid or eliminate the build up of sediments or unwanted particles or contamination (fouling or bio fouling), the movement or agitation of magnetically sensitive particles can be used to routinely clean the walls or specific surfaces of the containers/enclosures/chambers. Enabling the magnetically sensitive particles to vibrate and rub or interact with specific areas can help to maintain "clean" areas to improve the efficiency of the system.

The magnetically sensitive particles can have coatings that can be chemically active and/or functional. Functional coatings can act through effecting specific chemical, photochemical, and/or biochemical properties. Particles can be functionalised with particular "chemistries" (e.g., amino groups or hydroxyl groups). Such particles may selectively interact with specific analytes and/or salts in the solution in the chamber/enclosure. For example, magnetic beads with positively charged amino groups may attract anions. This could add an extra advantage in some chemical or biochemical sensing or processing applications.

For example, particles can be coated with a surfactant type material, such as polytetrafluoroethylene (PTFE), to reduce friction between particles and enable quick response times when exposed to a stimulus within the chamber/enclosure. Anti-reflective or anti-corrosion or anti-microbial (e.g., Ag, Cu, organosilanes, quaternary ammonium or another substance depending on the specifications of an application) coatings can be applied depending on the specifications of the application. Antimicrobial surfaces are functionalized in a variety of different processes. A coating may be applied to a surface that has a chemical compound that is toxic to microorganisms. Alternatively, it is possible to functionalize a surface by adsorbing a polymer or polypeptide and/or by changing its micro and nanostructure.

An innovation in antimicrobial surfaces is the discovery that copper and its alloys (e.g., brasses, bronzes, cupronickel, copper-nickel-zinc, and others) are natural antimicrobial materials that have intrinsic properties to destroy a wide range of microorganisms. There are applications where incorporating these materials within the system is desirable.

Antimicrobial surfaces have been utilized for their ability to keep surfaces cleaned, which may be significant in certain applications. The physical nature of the surface and/or the chemical composition can be manipulated to create an environment which should not be inhabited by microorganisms for a variety of different reasons. Photocatalytic materials have been used for their ability to kill many microorganisms and, therefore, can be used for self-cleaning surfaces as well as air cleaning, water purification, and antitumor activity.

Coatings to specifically attract or repel certain elements or materials may be applied. The specific coating applied may depend on the specifications of the system and the material that is passing through the chamber. Technologies such as nanoparticle deposition can be used to attach nanoparticles to solid surfaces (of the magnetic/conductive particles) creating coatings that could be constructed to react with the presence of specific elements.

A combination of different particle sizes, coatings, the incorporation of meshes and/or filters and/or membranes can be used to create an enhanced and/or optimized system to manipulate and/or treat and/or analyze fluid passing through a chamber.

Magnetically Sensitive Particles in Fluid for Flow Control

Embodiments disclosed herein relate to a container with magnetically sensitive particles in a fluid. Positions of the magnetically sensitive particles can impact fluid flow through openings in the container. The magnetically sensitive particles can be retained within the container. The magnetically sensitive particles and possibly the fluid can be selected such that the magnetically sensitive particles can move within the container in response to exposure to an applied magnetic field to adjust fluid flow through openings of the container.

FIGS. 1A, 1B, and 1C are schematic side or cross-sectional views of a container 12 that includes magnetically sensitive particles 14 in different positions that affect flow of fluid 16 according to an embodiment. The container 12 includes openings 17 that include groups of openings arranged as an inlet 17A and an outlet 17B. The openings of the inlet 17A and the outlet 17B are collectively referred to as openings 17. The openings 17 can be micro-holes that are smaller than the magnetically sensitive particles 14. Individual openings of the openings 17 can be smaller than individual particles of the magnetically sensitive particles 14 to retain the particles within the container 12. Fluid 16 can flow into the container 12 through openings arranged as the inlet 17A and out of the container 12 through openings arranged as the outlet 17B.

FIG. 1A illustrates the container 12 when no magnetic field is applied. The magnetically sensitive particles 14 can be positioned to allow free flow of fluid 16 through the container 12 when no magnetic field is applied.

The magnetically sensitive particles 14 can include any suitable combination of features of the magnetically sensitive particles disclosed herein. The magnetically sensitive particles 14 can include one or more of the following materials: iron, cobalt, nickel, graphite, chromium, or any suitable alloy thereof. The magnetically sensitive particles 14 can include one or more of the following materials: Heusler alloys or chromium oxide. In certain applications, magnetically sensitive particles 14 can include polystyrene (PS) magnetic particles. Polystyrene magnetic particles can be synthesized by embedding superparamagnetic iron oxide into polystyrene. Polystyrene magnetic particles can be positively charged (e.g., by amine modification), unmodified, or negatively changed (e.g., by carboxyl modification). In some applications, the magnetically sensitive particles 14 can include streptavidin coated magnetic particles. FIG. 1A illustrates a position of the magnetically sensitive particles 14 when no external magnetic field is being applied.

The fluid 16 can be a liquid or a gel having a viscosity suitable to facilitate movement of the magnetically sensitive particles 14 within the container 12 and to flow through one or more openings 17 of the container 12 such that the movement of the particles 14 can be controlled for adjusting fluid flow. The fluid 16 can have a suitable density and viscosity for a particular application. Example fluids 16 include without limitation aqueous solutions (e.g., buffers, aqueous electrolytes, aqueous solutions with conductive salts, aqueous solutions without conductive salts, pH buffers, salts in water, etc.), organic solutions (e.g., oils or organic solvents), aqueous or organic gels (e.g., a hydrogel, PVC, polyacrylic acid, a polyvinyl-alcohol gel, a polydimethylsiloxane gel, agarose-PBS, a PVC gel in organic solvents such as 2-nitrophenyl octyl ether, etc.), water, an alcohol, an oil, or a fluid that allows Brownian motion of magnetically sensitive particles within the fluid. In certain applications, the fluid 16 can change viscosity and/or phase with temperature. Such a fluid can be any suitable fluid disclosed in U.S. patent application Ser. No. 18/053,523, filed Nov. 8, 2022, the technical disclosure of which is herein incorporated by reference in its entirety and for all purposes.

A magnetic field source 18 can apply a magnetic field to move the magnetically sensitive particles 14 within the container 12. In some instances, the magnetic field source 18 can be a magnetic body. The magnetic field source 18 can include alternating poles. This can enhance attraction of magnetically sensitive particles 14 in certain applications. The applied magnetic field can be a gradient magnetic field to move the magnetically sensitive particles 14. A homogenous magnetic field can cause the magnetically sensitive particles 14 to attract each other and cluster. Clustering of magnetically sensitive particles 14 can increase the flow of the fluid 16 by providing less restriction, for example, as shown in FIG. 1B. Clustering of magnetically sensitive particles 14 can block openings, for example, as shown in FIG. 1C.

FIG. 1B illustrates a magnetic field source 18 applying a magnetic field to move the magnetically sensitive particles 14 away from the openings 17. This can reduce restriction of fluid flow relative to no magnetic field being applied and thereby increase fluid flow.

FIG. 1C illustrates the magnetic field source 18 applying a magnetic field to move magnetically sensitive particles 14 over the the openings 17 arranged as the outlet 17B. Blocking the outlet 17B can implement a closed valve. Fully blocking the outlet 17B, for example as shown in FIG. 1C, can result in no fluid 16 flowing through the outlet 17B. In some other applications, the magnetically sensitive particles 14 can partly block the outlet 17B to reduce flow of the fluid 16 to a non-zero fluid flow where some fluid 16 flows through the outlet 17B. Although blocking an outlet 17B is shown in FIG. 1C, any suitable principles and advantages disclosed herein can alternatively or additionally be applied to at least partly blocking one or more openings of an inlet 17A. Structures capable of moving the magnetically sensitive particles can be incorporated within the container 12 so that the magnetically sensitive particles can be remotely activated by powering up coils/magnetic structures embedded within the container 12. Remote activation can involve receiving a wireless signal using an antenna. A magnetic stimulus can be applied in response to the wireless signal.

In FIGS. 1B and 1C, the magnetically sensitive particles 14 are attracted to the applied magnetic field. The magnetically sensitive particles 14 can be paramagnetic, for example. Paramagnetic materials include metals that are weakly attracted to magnets. Examples of paramagnetic materials include lithium, aluminium, tungsten, platinum, and manganese salts. The magnetically sensitive particles 14 can be ferromagnetic. Such magnetically sensitive particles 14 can include one or more suitable ferromagnetic material, such as iron, nickel, or cobalt. In some other applications, the magnetically sensitive particles 14 can be diamagnetic and be repelled from the applied magnetic field. Examples of diamagnetic materials include graphite, gold, bismuth, antimony, quartz, and silver.

The container 12 can additionally incorporate a mesh and/or one or more membranes over the openings 17 through which the fluid 16 flows. The mesh and/or membrane(s) can filter the fluid 16 passing through and/or to improve the effectiveness of the magnetically sensitive particles 14 blocking the fluid flow through the openings. More details regarding a mesh and a membrane will be discussed with reference to FIG. 2C.

FIGS. 2A and 2B are schematic side or cross-sectional views of a container 12 that includes magnetically sensitive particles 14 impeding fluid flow through openings of the container 12 according to embodiments. The container 12 of FIGS. 2A and 2B includes an additional inlet or outlet relative to the container 12 of FIGS. 1A, 1B, and 1C.

A magnetic stimulus can cause particles to move to implement a fluid splitter where fluid from an inlet can be split to flow a selected outlet of a plurality of outlets. FIG. 2A illustrates a magnetic field source 18 applying a magnetic field to cause magnetically sensitive particles 14 to block one outlet 17B2 of the container 12. Another outlet 17B1 of the container 12 can be unimpeded such that the fluid 16 flows through the other outlet 17B1. In FIG. 2A, fluid 16 flows through inlet 17A and then through a selected outlet 17B1 of a plurality of outlets 17B1 and 17B1. This implements a split from inlet 17A to a selected one of two outlets 17B1 and 17B2. Flow control disclosed herein can be applied to splitting any suitable number of input fluid flows into any suitable number of outlets.

A magnetic stimulus can cause particles to move to implement a fluid mixer where fluid from a selected inlet of a plurality of inlets flows to an outlet. FIG. 2B illustrates a magnetic field source 18 applying a magnetic field to cause magnetically sensitive particles 14 to block one inlet 17A2 of the container 12. Another inlet 17A1 of the container 12 can be unimpeded such that the fluid 16 flows through the other inlet 17A1. In FIG. 2B, fluid 16 flows through selected inlet 17A1 of a plurality of inlets 17A1 and 17A2 and then through the outlet 17B. This implements a 2 to 1 mixer from a selected inlet of the inlets 17A and 17B to the outlet 17B. Flow control disclosed herein can be applied to mixing any suitable number of input fluid flows into any suitable number of outlets.

FIG. 2C illustrates additional structures that can be positioned about openings 17 in the container 12 of FIGS. 2A and 2B that can affect fluid flow according to embodiments. Any such additional structures can be implemented in the container 12 of FIGS. 1A, 1B, and 1C. The container 12 can incorporate any suitable materials and/or structures that can affect the fluid flow.

As shown in FIG. 2C, a filter 22 can be positioned over the openings 17. The filter 22 can be or include a mesh, for example. A membrane 24 can be positioned over the openings 17. In some instances, the membrane 24 can be a semi-permeable membrane. As illustrated in FIG. 2C, the membrane 24 is positioned over the filter 22. The filter 22 and/or the membrane 24 can filter fluid 16 passing through the openings 17. The filter 22 and/or the membrane 24 can retain the magnetically sensitive particles 14 within the container in instances where individual openings of the openings 17 are larger than individual particles of the magnetically sensitive particles 14.

Additional structures 26 can be positioned about the openings 17 to help de-foul specific areas or help to eliminate or minimize blockages or sediment build up and/or manipulate fluid flow. For example, sediment blocking an opening 17 can be moved by one or more additional structures 26. As another example, a magnetically sensitive particle 14 blocking an opening 17 can be moved by one or more additional structures 26. The additional structures 26 can include a piezoelectric element and/or a heating element. The additional structures 26 can be combined and/or modified for a particular application. Additional structures can stimulate particle movement and agitate fluid in specific locations (for example, mechanically dislodging sediment, blockages, and/or unwanted material build-up) or activate piezoelectric elements and/or heating elements may also help to defoul and/or remove blockages and remove unwanted sediment.

Figure 2E:
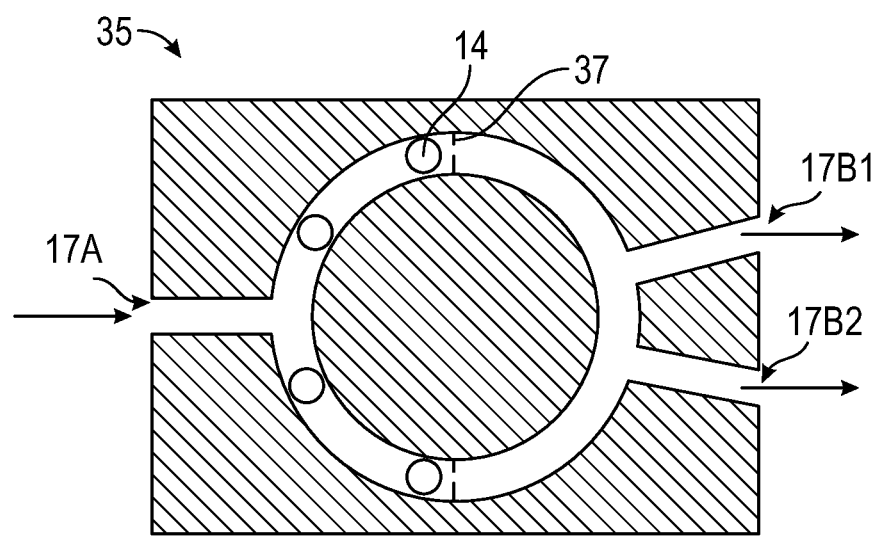

FIGS. 2D and 2E show container comprising a circular flow. Container/chambers constructed with circular flow paths may have certain advantages over other shapes in that enclosing magnetically sensitive particles/structures to divert flow through a specific/desired outlet can be controlled more easily within relatively narrow, more defined areas of curved channels. In certain applications, a container can include one or more curved portions.

FIG. 2D shows a plan view of a circular fluid path and a donut shaped chamber 30. This construction may provide certain advantages in manipulating the particles to enable flow through a specific outlet. The chamber 30 can be a container in which magnetically sensitive particles 14 are retained. Different particle sizes and/or shapes and/or structures can be integrated within the chamber to impede fluid flow. Different types of structures can also be integrated within the chamber 30 to manipulate the particles/shapes to impede flow or to open a path to respective outlets 17B1, 17B2. For example, one or more particles 14 can block output 17B1 and/or outlet 17B2. Meshes and/or filters and/or membranes 32 can be incorporated with the chamber 30 to restrain or contain particles 14 and/or structures within defined areas of the enclosure/circular structure. Each of the defined areas can be a container for the particle(s). Integrated structures 34, such as magnetic structures, can be integrated with the chamber 30. The integrated structures 34 can generate a stimulus to cause one or more of the particles 14 to move within the chamber 30. Different elements disclosed herein can be combined with features of the flow path and/or chamber of FIG. 2D to enhance and/or optimize the sensitivity of the system that enables fluid to flow in a specific path depending on the requirements of the specific application.

FIG. 2E shows another embodiment of a circular chamber 35 where the particles 14 are intentionally segregated between the inlet side and the half containing the two outlets. The chamber 35 can be a container for the particles 14. The area where the particles 14 are retained can be a container for the particles. The particles 14 can be retained in certain areas using meshes 37, for example. Membranes, filters, or other suitable structures can be implemented in place of meshes 37 as suitable in any of the embodiments disclosed herein.

Figure 2F:
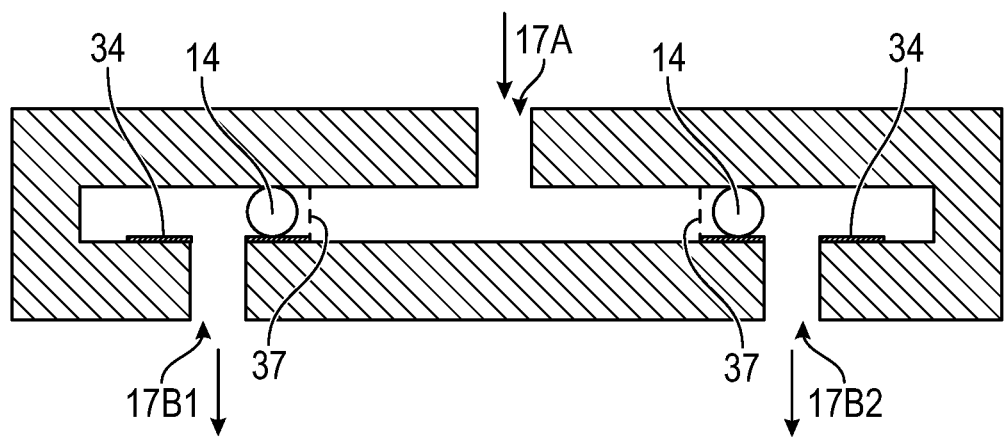
FIG. 2F shows another construction where particles within a specific area of a chamber can be manipulated to impede flow through a specific channel according to an embodiment.

FIG. 2F shows another construction where particles 14 can be manipulated to impede flow through a specific channel, which can be positioned on a lower plane to the inlet 17A. In FIG. 2F, particles 14 are constrained within a specific area of the chamber.

Figure 2G:
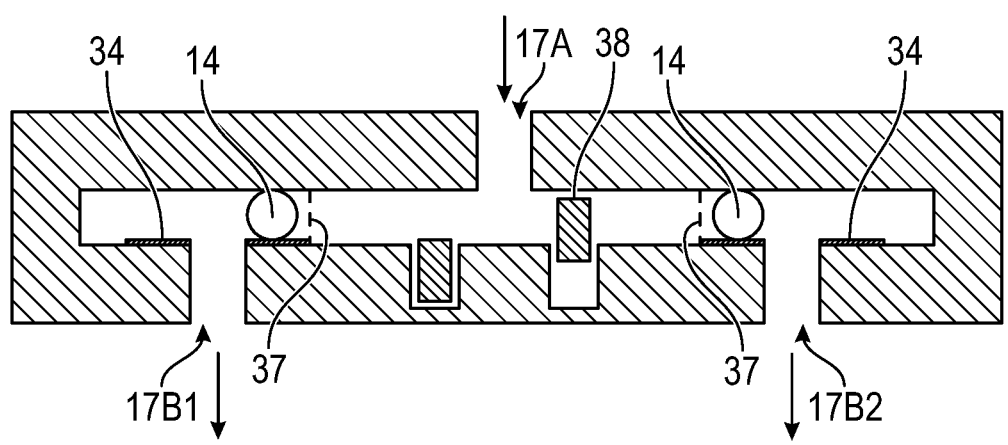
FIG. 2G shows where an actuator or switch mechanism can be incorporated within a container incorporating channels to further control the flow from an inlet to a specific outlet according to an embodiment.

FIG. 2G shows where an actuator or switch mechanism 38 can be incorporated within a container to further control the flow from an inlet 17A to a specific outlet 17B1 or 17B2. The actuator or switch 38 can be stimulated though magnetic fields or any other suitable stimulus.

Figure 2H:
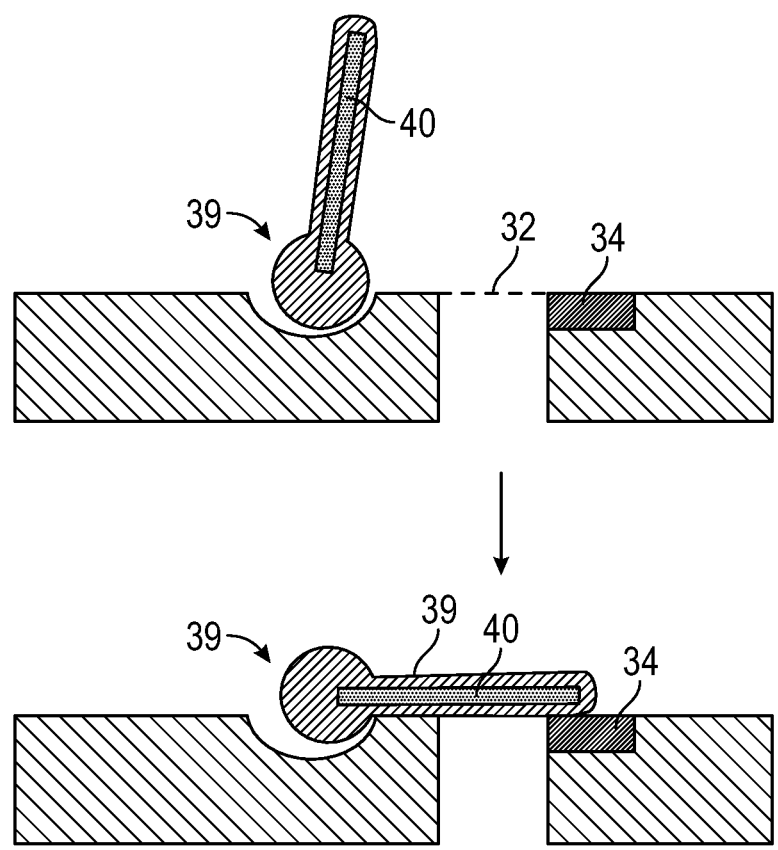
FIG. 2H shows a particle shape constructed to deliver a switch type mechanism to impede or enable flow through a channel according to an embodiment.

FIG. 2H shows another method of incorporating a movable switch or actuator in a chamber/container. The mechanism can be constructed such that it is activated by a magnetic field or another stimulus.

FIG. 2H shows where a particle shape or composite construction can be constructed to deliver a switch type mechanism to impede or enable flow through a channel. This can be activated in a number of ways. For example, an integrated structure 34 within the container/chamber can be activated to generate a magnetic stimulus causing the particle to move such that the aperture is blocked. As shown in FIG. 2H, the particle or structure can include a coating or protective layer 39 around a magnetic structure 40. One or more of shape, size, or construction of the materials can be selected to suit the specifications of a particular application. For example, a cluster of particles or a single particle shape (examples are shown in FIG. 3B) can be used depending on the specifications of the application. The use of filters, membranes, meshes 32 and/or other structures can be used to enhance the sensitivity and/or effectiveness of the system construction. In any suitable system and/or structure described herein, the manipulation of the particles/structures can be remotely enabled. For example, a wireless signal can be wirelessly transmitted to the system to cause a magnetic stimulus to move the magnetically sensitive particles.

Layer of Material with Magnetically Sensitive Particles

In some embodiments, magnetically sensitive particles can be embedded in and/or deposited on a layer of material. The layer of material can be within a container. The layer of material can be a film, a sheet of material, a flexible layer, or the like. For example, the layer of material can be a film with the magnetically sensitive materials embedded therein or a magnetic film or layer incorporated in a flexible laminate structure. As another example, the layer of material can be sheet of material or a flexible layer with magnetic material deposited or adhered thereon. The magnetically sensitive particles can be implemented in accordance with any suitable principles and advantages disclosed herein.

The layer can implement flow control in accordance with any suitable principles and advantages disclosed herein. The layer can move in response to a magnetic field such that the magnetically sensitive particles of the layer block at least part of an opening of the container to restrict fluid flow through the opening. The layer can move away from the opening in response to a magnetic field to increase flow of fluid through the opening.

The layer of material can be suspended within the container and/or relatively close to the channel openings within the container when not blocking opening(s) of the container. The layer of material can be tethered to the container. The layer of material can be tethered to the inside of the container and arranged such that the layer of material can deflect in response to a magnetic field. In certain applications, the layer of material can return to an initial position when no magnetic field is applied due, for example, to elasticity in the material of the layer.

The layer of material can be flexible substrate. Suitable materials for the layer include polymer materials such as SU-8, polyimide, polyvinyl alcohol, polyacrylic acid, polyvinylalcohol, polydimethylsiloxane, poly(3,4-ethylenedioxythiophene), Nafion, polyaniline, or the like. Some such polymer materials are conductive. In some instances, the layer can include a plastic such as polyethylene terephthalate (PET), polyethylene naphthalate (PEN), polyimide, or a transparent plastic. According to some applications, the layer can include a ferroelectric thin film. The layer can include thin glass. The layer can include a metal foil. The layer can have metal traces formed thereon and/or particles attached/embedded. The layer can include magnetic materials such as NiFe, Ni, NiFeCo, CoZrTa, CoFe, or the like. The layer can include gold in certain instances. In some instances, the layer can be a mesh rather than a continuous layer. Any suitable principles and advantages of the embodiments described with reference to magnetically sensitive particles can be applied to layers of material with magnetically sensitive particles.

Magnetically Sensitive Particles

Magnetically sensitive particles can have one or more properties such that the magnetically sensitive particles move in a desired way to the magnetic stimulus. For example, magnetically sensitive particles can be constructed, shaped, patterned, or the like so the magnetically sensitive particles respond to a magnetic stimulus in a desired way. As one example, a spiral shaped magnetic particle can respond to a magnetically induced force and move through fluid differently than a spherical or square shaped particle. The viscosity of the fluid and the shape of the magnetically sensitive particle can be balanced for movement of the magnetic particle in response to an applied magnetic field. The magnetically sensitive particles can be coated with an electrically conductive material (e.g., gold) such that when a certain amount of particles cluster or align, a conductive path is formed between electrical contacts in a container. The magnetically sensitive particles can be coated with a coating to enhance optical detection, such as a coating to achieve one or more of a desired optical contrast, color, fluorescence, luminescence, or another optical property. In certain instances, magnetically sensitive particles can be coated so as to not chemically react with a surface or other structure.

The shape of magnetically sensitive particles can affect how the magnetically sensitive particles move and cluster in certain applications. Depending on the outermost material, magnetically sensitive particles may stick together. In some applications, the magnetically sensitive particles can be coated with a thin material, such as Teflon or another polymer, so that there is little or no potential for the magnetically sensitive particles to stick together and/or cluster for any reason other than a response to a magnetic field. The container can incorporate one or more conductive vias and connections from the internal surfaces to the external. The container can incorporate one or more optical conduits and/or areas that facilitate optical detection of particle clusters or movement.

Magnetically sensitive particles can be constructed to move and/or respond in different ways. Sensitivity, such as movement, to certain field strengths can be improved with certain particle constructions, shapes, etc. The magnetically sensitive particles can be combined with and/or embedded within non-magnetic material to provide the effect of a partially patterned structure. The combined structure can then be inserted within a fluid, a gel, or a film.

In some instances, magnetically sensitive particles can include an outer coating that is magnetically sensitive. As an example, magnetically sensitive particles can be a polystyrene bead coated with nickel and/or another magnetically sensitive material. Such magnetically sensitive particles can have an overall density of magnetic material that is lower than a homogenous sphere of magnetically sensitive material. In some other examples, magnetically sensitive particles can have magnetically sensitive core materials and coatings selected to enhance or inhibit interaction with each other and/or the surrounding fluid. For example, the outer coating could be polystyrene, PTFE, Teflon, or some other polymer that can inhibit particles sticking together other than in a desired way as a response to stimulus from a magnetic field.

In certain instances, magnetically sensitive particles have an electrically conductive outer surface. For example, magnetically sensitive particles can be coated with gold. With such magnetically sensitive particles, an electric contact between two electrodes in a container can be closed.

Magnetically sensitive particles can have a coating with one or more specific optical properties in some applications. With such a coating, one or more of a contrast, a color, luminescence or fluorescence can be achieved. The coating with one or more specific optical properties can aid optical detection of magnetically sensitive particles.

Magnetically sensitive particles can be ferromagnetic, ferrimagnetic, paramagnetic, or diamagnetic. Diamagnetic particles are repelled by a magnetic field. In contrast, paramagnetic and ferromagnetic particles are attracted by a magnetic field.

The magnetically sensitive particles can have any suitable size for a particular application. The magnetically sensitive particles can be sized such that individual magnetically sensitive particles have a diameter larger than individual openings of a container. In certain applications, magnetically sensitive particles are micrometer scale or larger. In some applications, magnetically sensitive particles are millimeter-scale particles. Magnetically sensitive particles can be larger than millimeter-scale. In certain applications, magnetically sensitive particles can have a particle width in a range from about 50 nanometers to 1 millimeter. In some such applications, particle width can be in a range from about 0.1 micron to 100 microns. In some of these applications, particle width can be in a range from about 0.5 micron to 100 microns.

Magnetically sensitive particles can have a shape to influence their movement and/or orientation in the fluid such that their sensitivity to the magnetic field stimulus is enhanced and/or optimized. In certain applications, it may be desirable to have a non-symmetrical magnetically sensitive particle so that the magnetically sensitive particle moves in a particular way when exposed to a magnetic field. A combination of the shape of the magnetically sensitive particle and how the magnetically sensitive particle is embedded or suspended in a fluid/gel can be receptive to magnetic stimuli in particular directions and/or intensities. A particular particle shape combined with a fluid or gel of a particular viscosity can provide a desired sensitivity to a magnetic stimulus. Different particle sizes and shapes can be combined as desired for a range of target sensitivities within a system. The particles can also be constructed to have a shape that, for example, facilitates clustering or physical joining together of groups of particles.

Figure 3A:
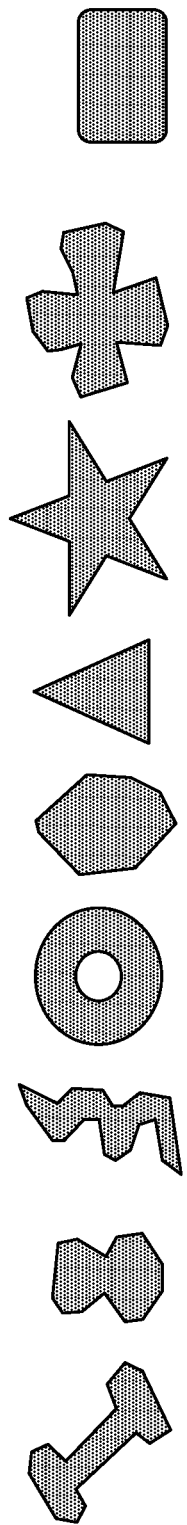
FIG. 3A illustrates example shapes of magnetically sensitive particles.
Figure 3B:
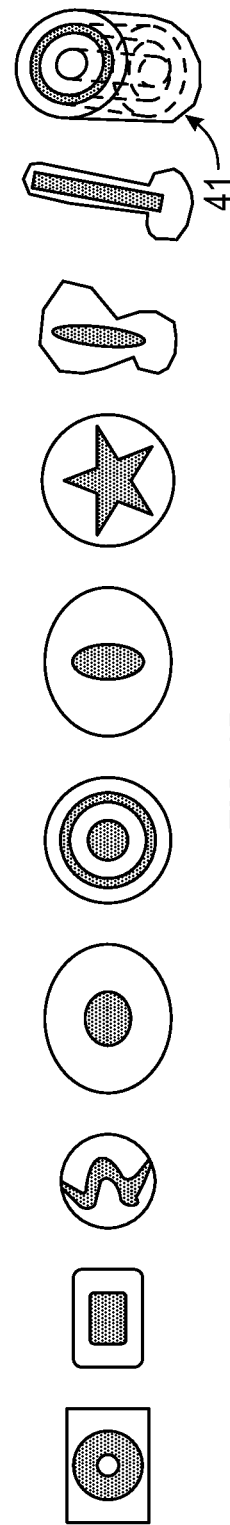
FIG. 3B illustrates example combined structures with magnetically sensitive particles included within non-magnetic material.
Figure 4A:
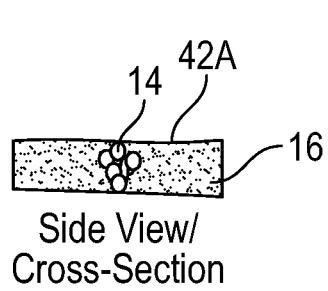
FIGS. 4A, 4B, 4C, 4D, 4E, and 4F are schematic side or cross-sectional views of example containers with various cross-sectional shapes according to embodiments.
Figure 4B:
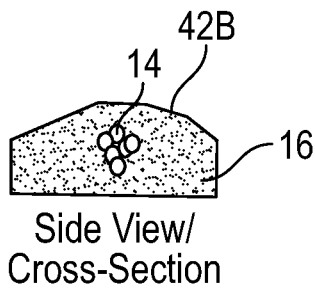
Figure 4C:
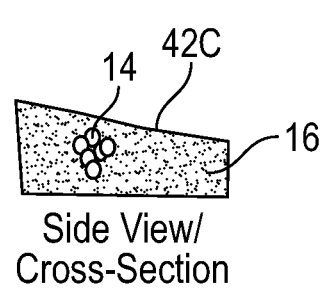
Figure 4D:
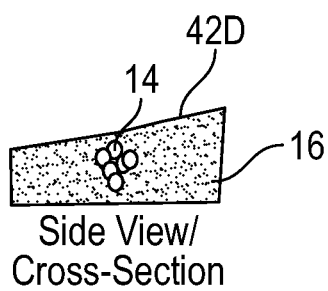
Figure 4E:
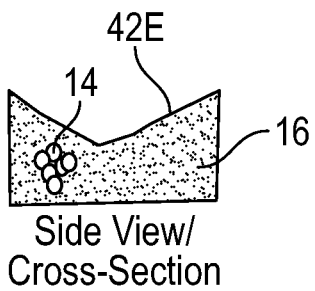
Figure 4F:
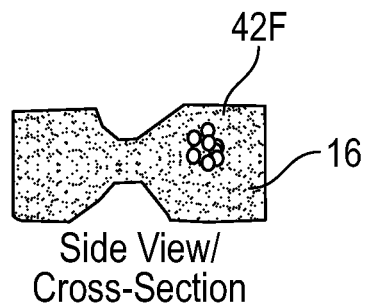

FIG. 3A illustrates example shapes of magnetically sensitive particles. The magnetically sensitive particles can be added to an inert, non-magnetic material to form a combined structure. FIG. 3B illustrates example combined structures with magnetically sensitive particles included within non-magnetic material. The particle construction (e.g., one or more of shape, size, construction, composite, constituent matter, layers, etc.) can be modified and optimized depending on the specifications of a particular application. Various processes, such as molding, printing, laser cutting, sputtering, plating, laminating, and the like, can be used to fabricate composite particles incorporating magnetically sensitive particles so that the magnetically sensitive particles react in a desired manner to a magnetic field. For example, with an outer non-magnetic layer, when a number of the composite particles come together, they may be held in a cluster by a magnetic field/force. Such composite particles can have non-magnetic material come into physical contact with one or more other composite particles. Such a construction can be desirable to allow release of such composite particles from one another in the absence of the magnetic field. For example, spherical particles with magnetic cores and covered with polystyrene/PTFE may be less likely to stick together and may bounce off each other. A combination of particle shape (e.g., spiral shape, propeller shape, etc.) and fluid viscosity can determine sensitivity and/or speed of a response to a magnetic field stimulus. One or more of the particle shape, construction and size can be modified and optimized depending on the specifications of a particular application.

Magnetically sensitive particles can have various sizes and densities. If all particles are the same size, a contact surface area can be relatively small. By using a plurality of sizes (e.g., large and small), a bridging structure can have more contact points. This can allow smaller particles to reduce resistance/increase current carrying capability.

As shown in FIG. 3B, magnetically sensitive particles can include a functional coating or composite layer. The functional coating can attract, repel, interact with, reduce friction, or the like. In some applications, a sleeve or cylinder 41 with an opening at the center can have a magnetically sensitive embedded within a wall.

Magnetically sensitive and/or conductive particles can be covered with a layer of material that repels (or attracts) some specific element or material so that we may use the particle mass to better ensure the closing of the outlet. Particles can physically and chemically close the gap in certain application. A device with one input and two outputs can be implemented where both outputs allow the fluid to exit but one of them restricts a particular element or material repelled by the particle coating. Such a device can, for example, more effectively measure and/or record a reference and a real sample could increase sensitivity and specificity.

Particles can also be functionalised with particular "chemistries" (e.g., amino groups or Hydroxyl groups). Such particles may selectively interact with specific analytes/salts in the solution in the chamber/enclosure. For example, magnetic beads with positively charged amino groups may attract anions. This can achieve an additional advantage in some chemical or biochemical sensing applications.

Containers

A container can be made of any suitable materials. The container can be flexible, include a laminate, a composite, a ceramic, glass, silicon, polymer or a metal. The container can include several different layers. Openings in the container can be sized and/or shaped for a desired fluid flow rate when the openings are unobstructed. The openings can be formed by any suitable process. The container can also contain channels within it for fluid to flow.

Containers for particles can have any suitable shape and size for a particular application. Containers with particles for flow control can be shaped to enhance and/or optimize fluid flow or agitation or detection of particles. The shape of a container can impact fluid flow therethrough. FIGS. 4A, 4B, 4C, 4D, 4E, and 4F illustrate example containers 42A, 42B, 42C, 42D, 42E, and 42F, respectively, with various cross-sectional shapes. In some instances, a container can include a constricted region (e.g., the container 42F of FIG. 4F includes a constricted region). Different container shapes can be utilized for particular applications.

One or more magnetic structures can be integrated with a container. For example, a magnetic sensor can be integrated with the container. As another example, a magnetic structure configured to generate a magnetic field can be integrated with the container. There may be an interaction between an external body with a magnetic field and magnetic material of a container that can affect magnetic particles in fluid. This interaction can produce a discernible electrical signature or otherwise be detected. The magnetic material incorporated with the container can interact with the magnetically sensitive particles within the container. This can deliver a sensitivity and/or interaction with an external environment that can be desirable in certain applications. Example magnetic structures that can be integrated with a container will now be discussed. Any suitable principles and advantages of these magnetic structures can be implemented together with each other.

FIG. 5A is a schematic isometric view of a container 12 that includes magnetically sensitive particles and a magnetic structure 52 on the container 12 according to an embodiment. The magnetic structure 52 can be deposited on the container 12. The magnetic structure 52 can be a block of magnetic material, layers of magnetic material, a composite structure incorporating magnetic material or a pattern of magnetic material. The shape and/or structure of the magnetic structure 52 can be selected depending on the specification of a particular application.

FIG. 5B illustrates example magnetic material patterns for the magnetic structure 52 on the container 12 of FIG. 5A.

Conductive structures can also be deposited on and/or integrated with a container that includes magnetically sensitive particles in a fluid. Such conductive structures can provide signal transmission, manipulate and/or interactive with the magnetically sensitive particles, or the like. These magnetic structures can be formed by any suitable method, such as sputtering, plating, screen-printing, or the like. The magnetic structures can have any suitable shape or pattern for a particular application. The magnetic structure can include conductive material. The example magnetic structure can implement suitable magnetic structure disclosed herein, such as the integrated structure 52 of FIG. 5A.

FIG. 5C illustrates examples of coils for antennas that can be implemented on the container 12 of FIG. 5A. Such antennas can wirelessly transmit signals associated a property of fluid flow through the container 12. In certain applications, an antenna can be included in a radio frequency identification (RFID) tag. As shown in FIG. 5C, a pair of antennas can be implemented. The antennas can be on the container 12 of FIG. 5A, for example.

FIG. 5D illustrates an example meander shaped structure that can be implemented on the container 12 of FIG. 5A. The magnetic structure 52 of FIG. 5A can have the meander shape shown in FIG. 5D. The meander shaped structure can generate a gradient magnetic field. In certain applications, a gradient magnetic field generated by a meander shaped structure can attract or stimulate magnetically sensitive particles better than a magnetic field generated by a coil.

FIG. 5E illustrates an example coil shaped structure that can be implemented on the container 12 of FIG. 5A. The magnetic structure 52 of FIG. 5A can have the coil shown in FIG. 5E. The coil shaped structure can generate a magnetic field in certain applications.

Figure 5F:
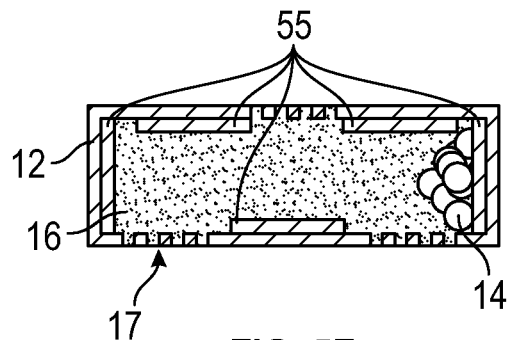
FIG. 5F is a schematic side or cross-sectional view of a container with openings and structures arranged to move particles within the container according to an embodiment.

FIG. 5F is a schematic side or cross-sectional view of a container 12 with openings 17 and movement structures 55 arranged to move particles within the container according to an embodiment. The movement structures 55 include areas of a container that can be enabled and/or stimulated to attract or manipulate the magnetically sensitive particles 14 such that the valve can be reset. Alternatively, the movement structures 55 can be enabled to repel magnetically sensitive particles 14 in some other applications. The movement structures 55 can implement a reset mechanism. The location and/or construction of the movement structures 55 can be determined depending on the specific specifications of a particular application. Piezoelectric material can also be incorporated to cause a mechanical pulse to dislodge and/or otherwise move particles that are stuck (or to de-foul or move/dislodge sediment build up). Heating elements can alternatively or additionally be incorporated.

Figure 6A:
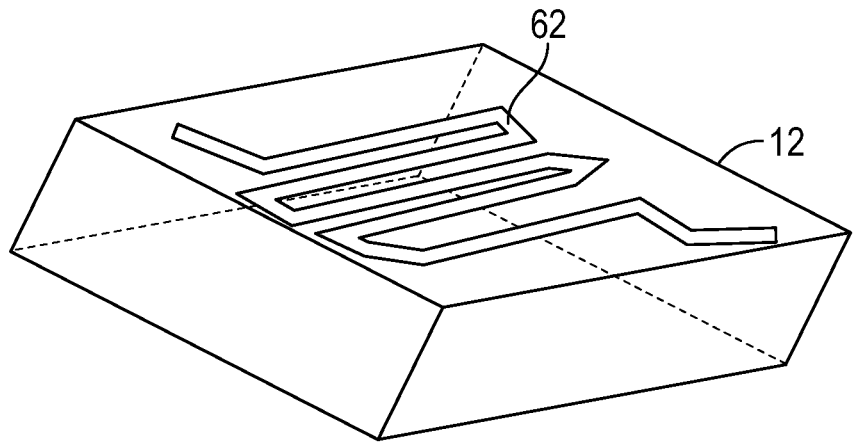
FIG. 6A is a schematic isometric view of an example container with an integrated heating element according to an embodiment.

A container can include one or more integrated structures, such as a heating element, a piezoelectric element or an electroactive polymer element. Such structures can be biasing structures arranged to reset positions of magnetically sensitive particles within a container. A heating element and/or a piezoelectric element can alter flow of fluid through openings in the container. FIG. 6A is a schematic isometric view of an example container 12 with an integrated heating element 62 according to an embodiment. The heating element 62 can be included on and/or within one or more layers of the container 12. The heating element 62 can be located in any suitable position of the container 12, such as on a top and/or a bottom of the container. The heating element 62 can be a resistive heating element, for example. The shape and/or size of the heating element can be modified depending on the application specifications. Heat generated by the heating element 62 can affect a fluid within the container 12. The heat generated by the heating element 62 can cause particles in the fluid to move and/or otherwise adjust the fluid flow. In certain applications, the heating element 62 can generate heat to reset the positions of the particles. The heat itself can provide impetus to move particles to a reset (e.g., randomly distributed) position or help to reduce sediment build up.

Figure 6B:
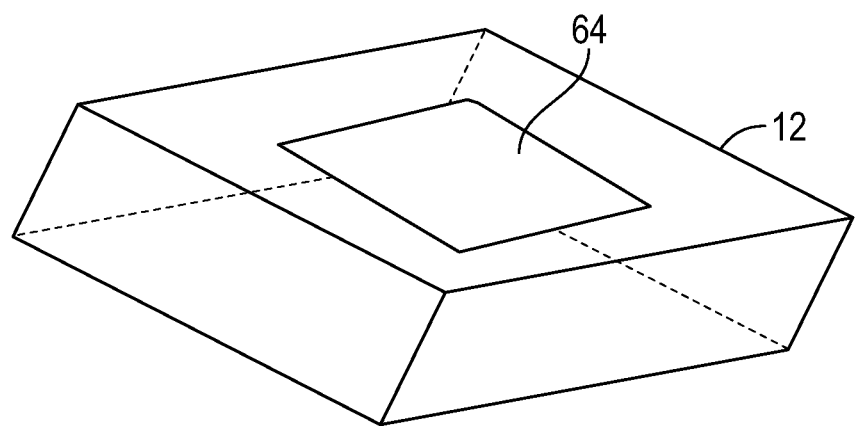
FIG. 6B is a schematic isometric view of an example container with an integrated piezoelectric element according to an embodiment.

FIG. 6B is a schematic isometric view of an example container 12 with an integrated reset mechanism, in particular a piezoelectric element 64 according to an embodiment. The piezoelectric element 64 can include piezoelectric material included on and/or within one or more layers of the container 12. The piezoelectric element 64 can be located in any suitable position of the container 12, such as on a top and/or a bottom of the container. One or more of the shape, size, or construction of the piezoelectric structure can be modified/optimized depending on the specification of a particular application. The piezoelectric element 64 can be activated to physically agitate particles in fluid within the container. This agitation can reset the positions of the particles. Agitation can dislodge magnetically sensitive particles that are stuck. An electroactive polymer can be implemented in place of or in combination with the piezoelectric element 64. A combination of a reset mechanism and a heat source, such as the piezoelectric element 64 of FIG. 6B and the heating element 62 of FIG. 6A, can be employed in separate layers in and/or on the container 12.

Agitation can be employed to increase the flow of fluid through openings in the container. The agitation from the piezoelectric element 64 can increase fluid flow through an opening. Alternatively, the agitation from the piezoelectric element 64 can increase fluid flow away from the opening. The impact of agitation by the piezoelectric element 64 on fluid flow through an opening of the container 12 can depend on the position of the piezoelectric element 64 relative to the opening. The agitation can also reduce and/or eliminate sediment build up and mitigate or prevent fouling in certain (e.g., critical) locations.

Containers can have multiple integrated structures in some applications. Such structures can provide a variety of functionalities in association with a container with magnetically sensitive particles in fluid.

Figure 7A:
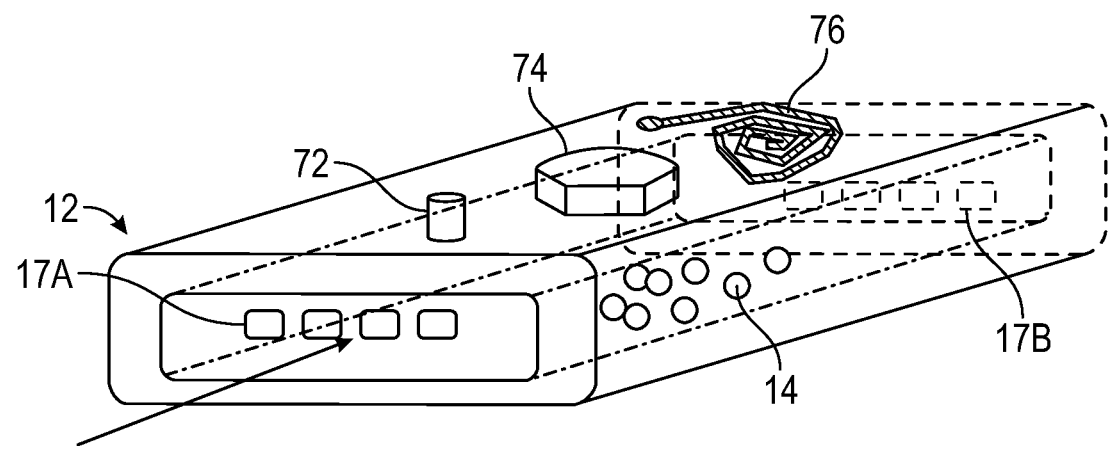
FIGS. 7A and 7B are schematic isometric and cross-sectional views of example containers with openings and a plurality of integrated structures according to embodiments.
Figure 7B:
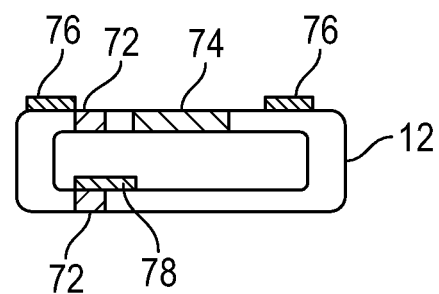

FIGS. 7A and 7B are schematic isometric and cross-sectional views of example containers 12 with openings and a plurality of integrated structures according to embodiments. The integrated structures can interact with magnetically sensitive particles 14 within fluid in a container 12. Fluid can flow through the inlet 17A through the container 12. As illustrated, a conductive feature 72, an optical window 74, and a trace 76 are integrated with the container 12 in FIGS. 7A and 7B. In FIG. 7B, a conductive trace 78 is included within the container 12. The conductive feature 72 can be a via or conductive trace embedded in the structure of the container 12. The conductive feature 72 can extend through a wall of the container 12. The conductive feature 72 can provide an electrical connection from inside of the container 12 to external to the container 12. For example, the conductive feature 72 electrically connects conductive trace 78 in the container 12 with trace 76 that is outside of the container 12 in FIG. 7B. The optical window 74 can provide a window for optical detection of magnetically sensitive particles in the container 12. The optical window 74 can be embedded in the structure of the container 12. The trace 76 can be a conductive trace or conductive coil integrated with the container. As illustrated in FIGS. 7A and 7B, the trace 76 can be on an outer surface of the container 12. The trace 76 can apply a magnetic field, be a sensing structure (e.g., magnetic or conductive sensing structure), provide signal routing, or facilitate wireless communication. Internal portions of the container 12 can contain conductive structures 78 and/or sensing structures, which can interact with particles within the container 12. More than one of any of the illustrated structures in FIG. 7A and/or FIG. 7B can be implemented in various applications.

Figure 8A:
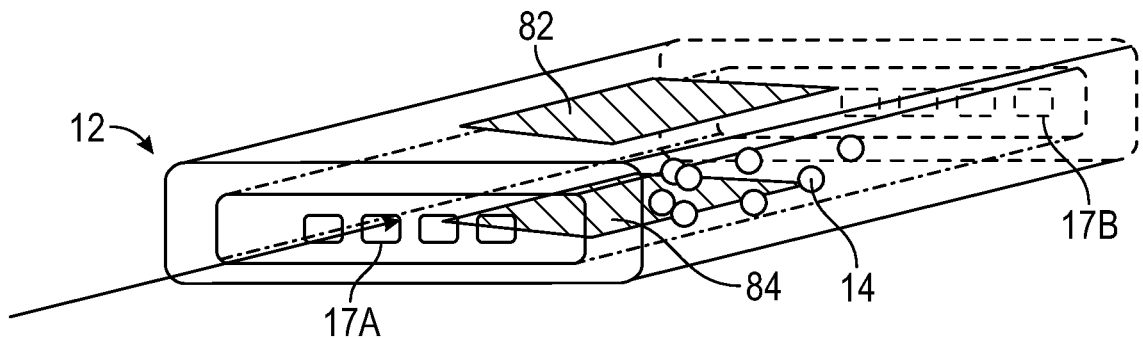
FIGS. 8A, 8B, 8C, 8D, and 8E are schematic views of example containers with openings and integrated conductive structures or sensors according to embodiments.
Figure 8B:
Figure 8C:
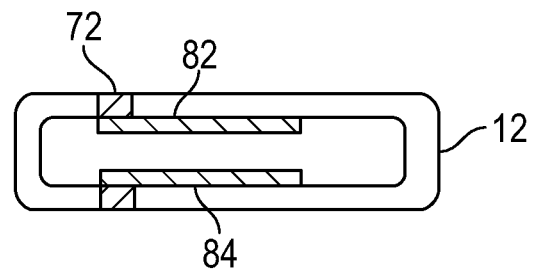

FIGS. 8A, 8B, 8C, 8D, and 8E are schematic views of example containers 12 with openings and integrated conductive structures or sensors according to embodiments. Conductive structures 82 and 84 can be located on an inner surface of these example containers 12. FIG. 8B illustrates example conductive structures 82, 84. The conductive structures 82, 84 can be coil shaped, spiral shape, include concentric shapes, or the like. The conductive structures 82, 84 can have any suitable pattern or shape for a particular application. The conductive structures 82 and/or 84 can detect and/or manipulate magnetically sensitive particles 14 within the container 12. As illustrated in FIG. 8C, a conductive feature 72 can provide an electrical connection from the conductive structure 82 or 84 and to an element or feature outside of the container 12.

Figure 8D:
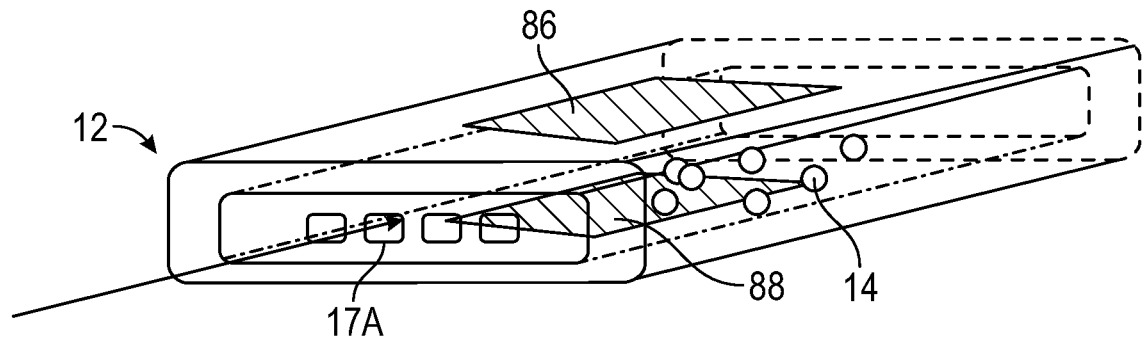
Figure 8E:
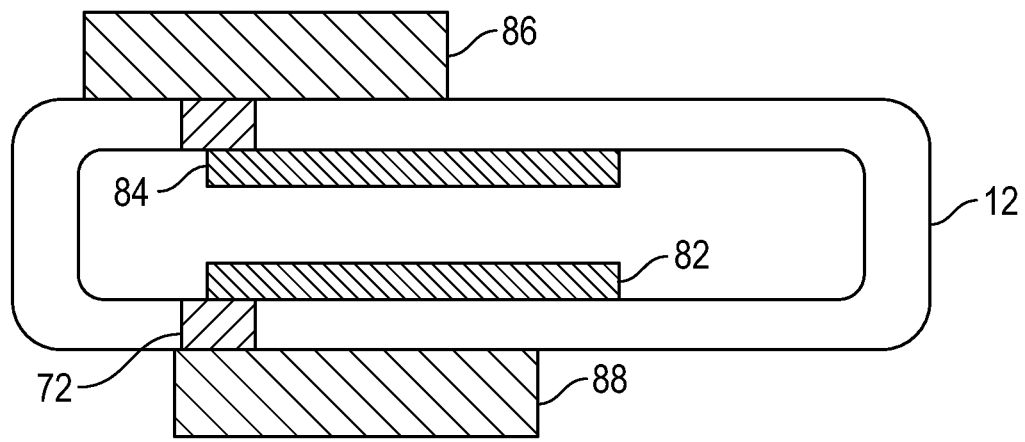

In FIGS. 8D and 8E, a fluid property between sensing elements 86 and 88 can be measured and/or magnetically sensitive particles 14 can be detected. The sensing elements 86 and 88 can detect a change in one or more of conductivity, magnetic field intensity, pH, resistivity, or the like. For example, a fluid in the container 12 between sensing elements 86 and 88 can have a dielectric constant. The dielectric constant of the fluid can change by having more or fewer magnetically sensitive particles located between the sensing elements 86 and 88. In some cases, an inference of the change in dielectric constant can be measured. As the dielectric constant changes, a discernible electrical change between the sensing elements 86 and 88 that can be measured in certain applications. In some other applications, sensing elements 86 and/or 88 can implement optical detection. An optical source, such as a broadband light source or a fixed wavelength laser, can emit light and a sensing element 86 and/or 88 can be an optical detector, such as a photodiode detector. The optical detector can detect magnetically sensitive particles 14 and/or one or more properties of fluid flowing through the container 12 in these applications. In some instances, there can be also a reference container to calibrate out any drift inaccuracies. The reference container can be used with any suitable sensing modality depending on the specifications of a particular application.

Systems and Modules

Systems can include a container with magnetically sensitive particles for flow control. Such systems can also include one or more structures integrated with the container. Such systems can control or modify fluid flow, detect magnetically sensitive particles within the container, move the magnetically sensitive particles with the container, otherwise interact with magnetically sensitive particles within the container, send wireless communications associated with fluid flow and/or position of magnetically sensitive particles, the like, or any suitable combination thereof. The container can be integrated with, for example co-packaged with, any suitable structures disclosed herein. In some instances, an integrated circuit or other circuitry is integrated with the container.

FIGS. 9A to 12 illustrate systems and modules that include a container containing magnetically sensitive particles that can adjust fluid flow through the container. Any suitable principles and advantages of these embodiments can be implemented together with each other. Moreover, the embodiments of FIGS. 9A to 12 can be implemented with any other suitable principles and advantages disclosed herein (e.g., related to containers with openings, magnetically sensitive particles, etc.)

A container including magnetically sensitive particles can be included in a system in package (SIP). A SIP is an example of a packaged module containing processing circuitry, passives, discrete circuit elements, chiplets, etc. The container can extend to an edge of the package to an external environment. In certain applications, an agitation or mixing element can be embedded as desired within a SIP to agitate or mix fluid that contains magnetically sensitive particles. The packaging structure can include a molding material, a sealed cavity or "can," capped structures, composite material, laminate structures, or any other suitable structure to protect integrated circuits.

Figure 9A:
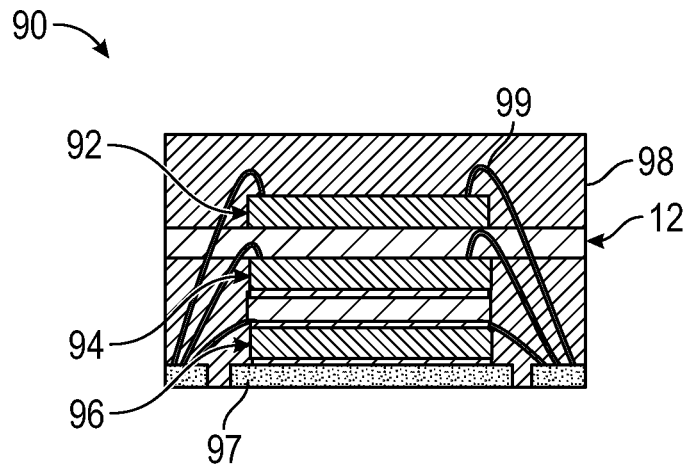
FIG. 9A is a schematic side or cross-sectional view of a system-in-a-package (SIP) that includes a container according to an embodiment.
Figure 9B:
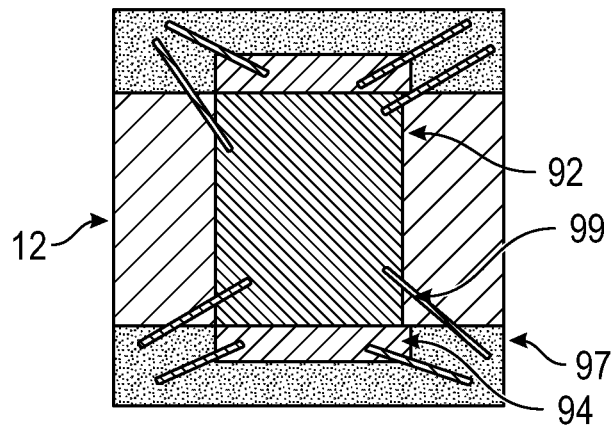
FIG. 9B is a schematic plan view of the SIP of FIG. 9A.
Figure 10:
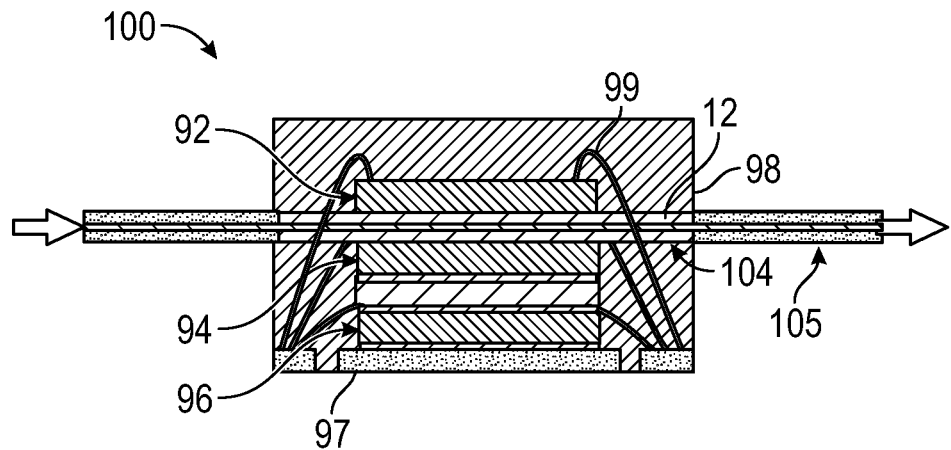
FIG. 10 is a schematic side or cross-sectional view of a SIP that includes a container according to an embodiment.

The magnetically sensitive particles can move within the container in response to a magnetic stimulus. The magnetic stimulus can be generated by an integrated structure. The magnetic stimulus can be generated external to the SIP. A sensor can be integrated and co-packaged with the container. A processing die and/or application specific integrated circuit (ASIC) can be included in the SIP. One or more spacers and/or insulating layers can be included in the SIP. FIGS. 9A to 10 illustrate example SIPs according to embodiments.

FIG. 9A is a schematic side or cross-sectional view of a system-in-a-package (SIP) 90 that includes a container 12 with magnetically sensitive particles according to an embodiment. FIG. 9B is a schematic plan view of the SIP 90 of FIG. 9A. In the SIP 90, the container 12 extends to an edge of the package. This can provide an interface between the container 12 and an external environment. Magnetically sensitive particles in the container 12 can provide valving or other flow control for fluid flowing through the container 12.

As illustrated, the container 12 extends horizontally and is vertically integrated with the plurality of die 92, 94, 96 on a package substrate 97. The package substrate 97 can be a laminate substrate, for example. A package structure 98 can enclose the plurality of die 92, 94, 96 and the container 12. The package structure 98 can include molding material. The container 12 is stacked with a plurality of dies 92, 94, and 96. The dies 92, 94, and 96 can be electrically connected to each other and/or contacts of the SIP 90 and/or one or more other element of the SIP 90 by conductive features 99. One or more conductive features 99 can provide electrical connection(s) to a structure of the container 12. The conductive features 99 can be wire bonds as illustrated. Any other suitable conductive features such as bumps, plated traces, conductive paste, anisotropic conductive film, etc. can alternatively or additionally be implemented. The conductive features 99 can be within the package structure 98.

The dies 92, 94, and 96 can include one or more sensors, one or more ASICs, and/or one or more processing dies, chiplets, passives, discrete circuit elements, etc. The dies 92, 94, and 96 can be semiconductor dies, such as silicon dies. For example, the die 94 can include a sensor and the die 96 can include a measurement circuit configured to process an output of the sensor and generate an output signal associated with one or more properties of a fluid flowing through the container 12 and/or with a magnetic field and/or positions of the magnetically sensitive particles. This output signal can be provided to a contact of the SIP 90. The output signal can alternatively be wirelessly transmitted by the SIP 90 when the SIP 90 includes an antenna. As another example, the die 94 can include both the sensor and the measurement circuit. As one more example, the die 94 can include a structure to generate a magnetic field (e.g., a meander structure) and the die 96 can include control circuitry to control generation of the magnetic field. This can cause magnetically sensitive particles within the container 12 to move to adjust fluid flow in accordance with any suitable principles and advantages disclosed herein. In another example, the die 94 can include both the structure to generate the magnetic field and the control structure. In certain applications, a sensor is included in the SIP 90 and not included on any of the dies 92, 94, or 96.

FIG. 10 is schematic side or cross-sectional views of a SIP that include a container 12 according to an embodiment. In the SIP 100, a spacer layer 104 can include a container 12 to interact with an external environment. The spacer layer 104 can be an insulating layer. The spacer layer 104 can include another element, such as an optical link, to interact with the external environment. The container 12 of the SIP 100 can be connected to a connection element 105. The connection element 105 can be a fitting, a tube, a filter, a micro pump, or any other suitable element for a particular application. There can be connections from an external to the SIP 100 to the spacer layer 104. There can also be connections within the vertically integrated elements of the SIP 100. Fluid containing magnetically sensitive particles can be provided to the container 12 of the SIP 100 for monitoring and/or analysis. The monitoring and/or analysis can be of flow of fluid through the container 12. Magnetically sensitive particles in the container 12 can provide valving and/or flow control monitoring and/or enable analysis of fluid in the container 12. The container 12 can be part of a larger container that extends outside of the SIP 100, and the SIP 100 can perform sensing and analysis of the fluid flowing through the container 12 within the SIP 100.

A container with magnetically sensitive particles can implement a valve in a variety of different systems. The magnetically sensitive particles can at least partially block one or more openings to impede flow into and/or out of the container. On the other hand, the magnetically sensitive particles can be controlled to enable fluid flow through one or more openings. A valving function performed by a container with magnetically sensitive particles can impede or enable fluid flow from the container to a particular channel of a plurality of outlet channels. Alternatively or additionally, the valving function can impede or enable fluid flow from a particular channel of one or more inlet channels into the container.

Figure 11A:
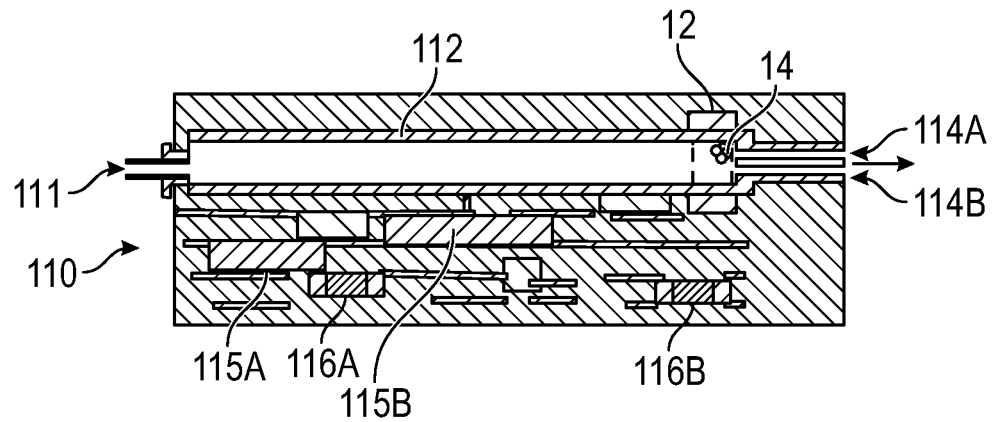
FIG. 11A is a schematic diagram of a system that includes a lateral channel incorporating a container configured to provide flow control according to an embodiment.

FIG. 11A is a schematic diagram of a system 110 that includes a lateral channel 112 incorporating a container 12 configured to provide flow control according to an embodiment. The system 110 is configured to selectively divert or control the flow of fluid along a specific channel. The container 12 of the system 110 is shown in more detail in FIG. 11B. In the system 110, fluid can flow through an inlet 111 into the lateral channel 112 to the container 12. A valving function can be performed by controlling magnetically sensitive particles 14 within the container 12. Structures 118A and/or 118B can be enabled to move particles blocking or opening channel 114A or 114B. Fluid can flow into the container 12 through openings arranged an inlet 17A (shown in FIG. 11B). The magnetically sensitive particles 14 can be controlled to impede or enable flow through the container 12 to a particular outlet channel of a plurality of outlet channels 114A, 114B. As illustrated, magnetically sensitive particles 14 are impeding fluid flow through outlet 17A (shown in FIG. 11B) and fluid is flowing through outlet 17B (shown in FIG. 11B) to outlet channel 114B. In certain applications a mesh and/or a membrane can be incorporated into the container 12. Such a mesh and/or membrane can increase and/or optimize effectiveness of the container 12 performing a valving function. The mesh and/or membrane can alter flow of fluid through openings in the container 12. One or more of the size, shape, construction of particles, mesh, membrane thickness etc. can be modified to suit the specifications of a particular application.

The illustrated system 110 includes a plurality of components integrated with the container. Such components can be embedded in a substrate. As illustrated, the system 110 includes processing dies 115A, 115B (e.g., ASICs) and discrete passive components 116A, 116B (e.g., one or more capacitors, one or more inductors, one or more resistors, etc.). Any other suitable circuitry can alternatively or additionally be included in the system 110.

Figure 11B:
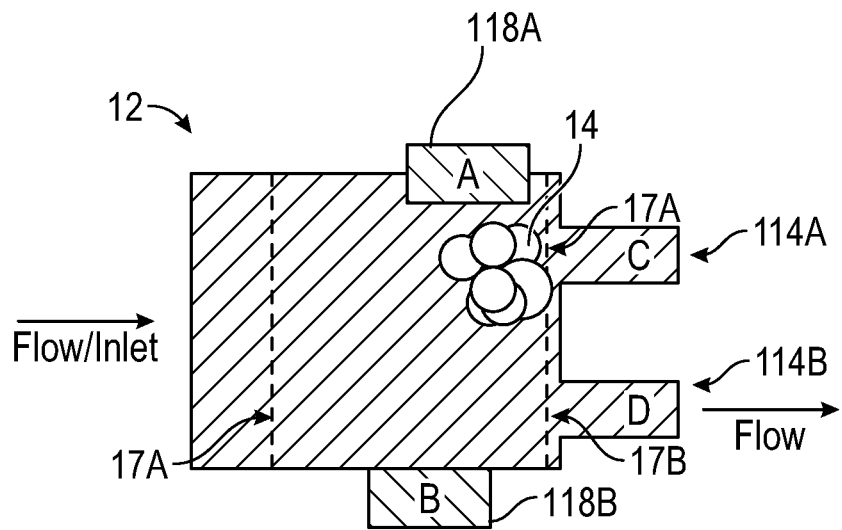
FIG. 11B illustrates a valving function to direct flow of fluid through a particular channel according to an embodiment.

FIG. 11B illustrates the container 12 of FIG. 11A performing a valving function to direct flow of fluid through a particular channel 114B according to an embodiment. Such a container 12 can be embedded or otherwise integrated into any suitable microfluid system to direct fluid flow through a channel for a particular application.

Fluid flow systems can wirelessly communicate with another device. Such a system can include one or more antennas that can wirelessly transmit information associated with fluid flow, one or more properties of fluid flowing through a container, positions of magnetically sensitive particles with the container, or any suitable combination thereof. The one or more antennas can wirelessly communicate any other suitable information.

Figure 12:
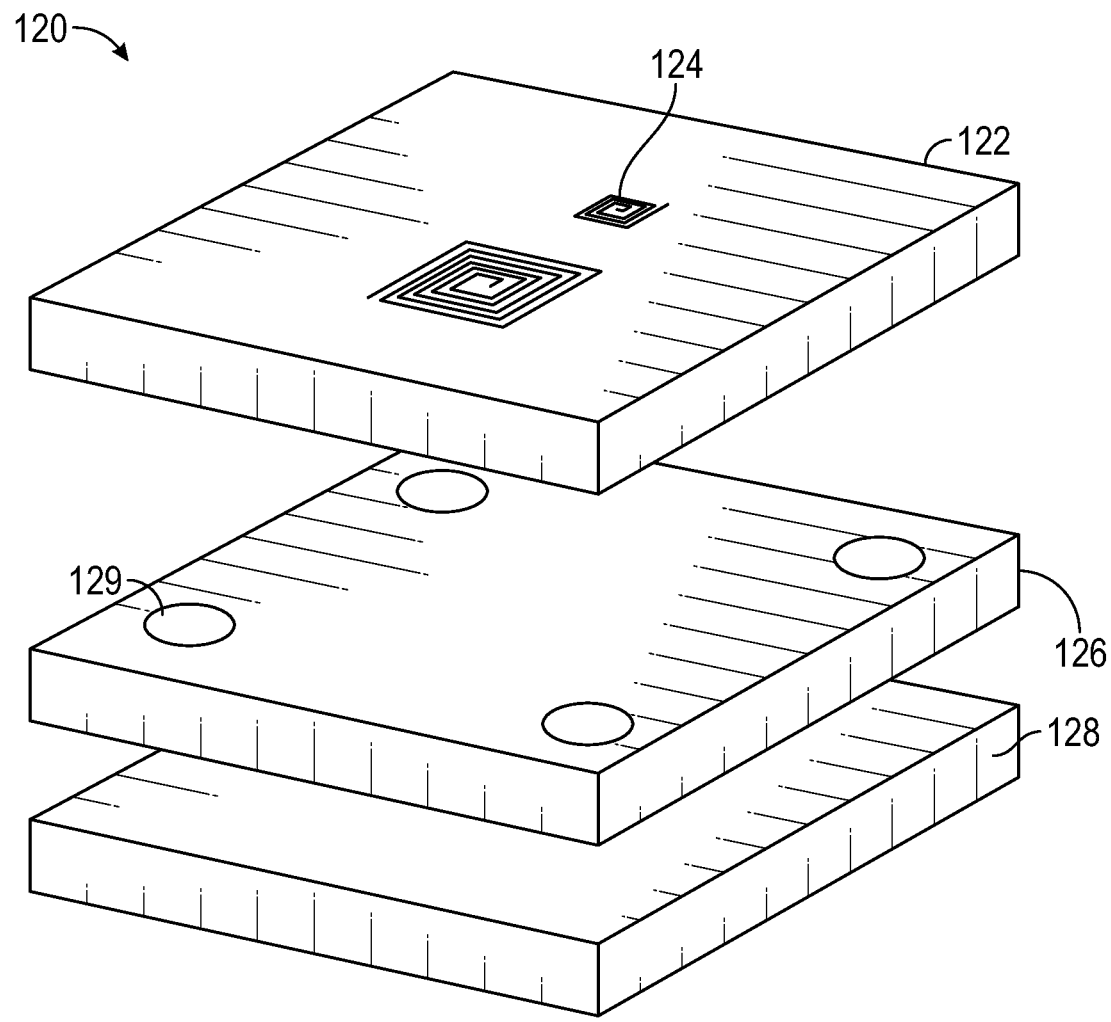
FIG. 12 illustrates an exploded schematic view of an example system with wireless communication according to an embodiment.

FIG. 12 illustrates an exploded schematic view of an example fluid flow system 120 according to an embodiment. The fluid flow system 120 includes a wireless communication layer 122 that includes one or more antennas 124, a layer 126 including an integrated circuit that includes circuitry of a measurement circuit, and a layer 128 that includes a container with magnetically sensitive particles for flow control in accordance with any suitable principles and advantages disclosed herein. Conductive vias 129 and/or traces can electrically connect layers of the fluid flow system 120. The one or more antennas 124 can include a coil, for example. The one or more antennas 124 can be included in a radio frequency identification (RFID) tag. The wireless communication layer 122 can include circuitry to support wireless signal transmission, or such circuitry may be provided in a lower layer, such as the layer 126. The circuitry to support wireless signal transmission can encrypt data for wireless signal transmission. The one or more antennas 124 can transmit encrypted data. A wireless communication layer can be incorporated within a SIP, module, or system in a number of ways. It can be stacked or placed side by side or heterogeneously constructed using chiplets (with incorporated coils and structures). The fluid flow system can also incorporate conductively coupled and/or optical methods of communication. The system construction can be modified and/or optimized depending on the specifications of a particular application.

Measurements

Position and/or movement of particles in a container can be measured in a variety of different ways. Without limitation, example measurements include case conductance measurements, zero-power direction detection measurements, cumulative magnetic field exposure detection measurements, microelectromechanical systems based measurement, optical measurements, and capacitive measurements. Example measurement systems and methods are disclosed in U.S. patent application Ser. No. 17/933,600, filed Sep. 20, 2022, the technical disclosure of which is herein incorporated by reference in its entirety and for all purposes. Any suitable principles and advantages of such measurement systems can be implemented in accordance with any suitable principles and advantages disclosed herein.

One or more properties of a fluid flowing through a container can be measured in a variety of different ways. Without limitation, example measurements include optical measurements, capacitive measurements, and microelectromechanical systems based measurements. Impedimetric, electrochemical or other methods of measurement can alternatively or additionally be used, depending on the specific application.

Magnetically sensitive particle movement within a chamber can be monitored such that their movement denotes a fluid property such as one or more of viscosity, pressure, flow rate, turbulence, etc. Particles can be constructed (e.g., sized and/or shaped) such that their movement can be detected acoustically (e.g., by a MEMs microphone) or through a motion/vibrational sensor (e.g., an accelerometer), which may be an indication of higher level features (e.g., abundance of a particular component within the fluid/chamber).

CONCLUSION

In the embodiments described above, apparatus, systems, and methods for adjusting fluid flow using particles in a container are described in connection with particular embodiments. It will be understood, however, that the principles and advantages of the embodiments can be used for any other systems, apparatus, or methods with a need for adjusting fluid flow.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of flow adjustment, the method comprising:
   allowing fluid to flow through an opening in a container, wherein magnetically sensitive particles are confined within the container;
   applying a magnetic field to move the magnetically sensitive particles in the container to adjust flow of the fluid through the opening; and
   resetting positions of the magnetically sensitive particles using a biasing structure.

2. The method of claim 1, wherein the applying causes the magnetically sensitive particles to block the opening such that no fluid flows through the opening in response to the applying.

3. The method of claim 1, wherein the applying causes the magnetically sensitive particles to block the opening to reduce flow of the fluid through the opening to a non-zero flow in response to the applying.

4. The method of claim 1, wherein the applying causes the magnetically sensitive particles to increase flow of the fluid through the opening by providing less flow restriction.

5. The method of claim 1, wherein the container comprises a plurality of openings, and individual particles of the magnetically sensitive particles are larger than individual openings of the openings.

6. The method of claim 1, further comprising receiving a wireless signal, wherein the applying the magnetic field is in response to the wireless signal.

7. The method of claim 1, wherein the opening is an outlet of the container, the applying causes the magnetically sensitive particles to block at least part of the opening, and the container comprises a second outlet that is not blocked by the magnetically sensitive particles as a result of the applying.

8. The method of claim 1, wherein the opening is an inlet of the container, the applying causes the magnetically sensitive particles to block at least part of the opening, and the container comprises a second inlet that is not blocked by the magnetically sensitive particles as a result of the applying.

9. The method of claim 1, further comprising altering the flow of the fluid through the opening with at least one of a mesh, a membrane, a heating element, or a piezoelectric element.

10. The method of claim 1, further comprising moving particles to dislodge material build-up and/or to clean specific areas within the container.

11. The method of claim 1, wherein the magnetic field is applied with a magnetic structure that is integrated with the container.

12. A system with flow restriction, the system comprising:
    a container comprising an opening;
    magnetically sensitive particles that are retained within the container;
    a magnetic structure configured to apply a magnetic field to cause at least one of the magnetically sensitive particles to block at least part of the opening to thereby restrict flow of fluid through the opening; and
    at least one of a mesh, a membrane, a heating element, or a piezoelectric element configured to adjust flow of the fluid.

13. The system of claim 12, wherein the system is configured to selectively divert the flow of fluid along a specific channel.

14. The system of claim 12, further comprising a sensor configured to output information indicative of a property of the fluid flowing through the container.

15. The system of claim 14, further comprising an antenna configured to wirelessly transmit the information indicative of the property of the fluid flowing through the container.

16. The system of claim 12, wherein the container comprises a plurality of openings, and individual particles of the magnetically sensitive particles are larger than individual openings of the plurality of openings.

17. The system of claim 12, wherein the magnetic structure is integrated with the container.

18. A system with flow restriction, the system comprising:
    a container comprising an opening;
    magnetically sensitive particles that are retained within the container, wherein the magnetically sensitive particles have a coating that reacts to a specific element or material; and
    a magnetic structure configured to apply a magnetic field to cause at least one of the magnetically sensitive particles to block at least part of the opening to thereby restrict flow of fluid through the opening.

19. The system of claim 18, further comprising a biasing structure configured to reset positions of the magnetically sensitive particles.

* * * * *